United States Patent [19]

Yamaguchi et al.

[11] Patent Number: 5,124,961
[45] Date of Patent: Jun. 23, 1992

[54] FLOATING HEAD FOR USE WITH A RECORDING APPARATUS OF MAGNETO-OPTICAL MEMORY DEVICE

[75] Inventors: Shoji Yamaguchi; Akemi Murakami; Takashi Nomiyama; Kaoru Yasukawa; Daisuke Iguchi, all of Kanagawa, Japan

[73] Assignee: Fuji Xerox Co., Ltd., Tokyo, Japan

[21] Appl. No.: 633,336

[22] Filed: Dec. 27, 1990

[30] Foreign Application Priority Data

Dec. 28, 1989 [JP] Japan .................................. 1-338600
Jan. 16, 1990 [JP] Japan ...................................... 2-4558

[51] Int. Cl.$^5$ ............................................. G11B 13/04
[52] U.S. Cl. ..................................... 369/13; 360/103; 360/66; 360/114
[58] Field of Search ...................... 369/13; 365/122; 360/59, 114, 110, 115, 119, 122, 123, 125, 126, 66, 103

[56] References Cited

U.S. PATENT DOCUMENTS

| 4,588,995 | 5/1986 | Nishimura | 360/59 |
| 4,796,241 | 1/1989 | Hayakawa | 360/59 |
| 4,890,178 | 12/1989 | Ichihara | 369/13 |
| 4,959,820 | 9/1990 | Horimai | 369/13 |
| 4,977,549 | 12/1990 | Berg | 369/13 |

FOREIGN PATENT DOCUMENTS

| 3730969 | 3/1989 | Fed. Rep. of Germany | 369/13 |
| 0122244 | 9/1980 | Japan | 369/13 |
| 0066532 | 4/1982 | Japan | 369/13 |
| 0094906 | 6/1982 | Japan | 360/114 |
| 0284845 | 12/1986 | Japan | 360/114 |
| 0018637 | 1/1987 | Japan | 360/114 |
| 0048249 | 2/1989 | Japan | 369/13 |
| 0224902 | 9/1989 | Japan | 369/13 |
| 0241081 | 9/1989 | Japan | 369/13 |
| 0094102 | 4/1990 | Japan | 369/13 |
| 0154348 | 6/1990 | Japan | 369/13 |

Primary Examiner—Stuart S. Levy
Assistant Examiner—Hoa Nguyen
Attorney, Agent, or Firm—Finnegan, Henderson, Farabow, Garrett and Dunner

[57] ABSTRACT

A floating head for use with a recording apparatus of magneto-optical memory type comprising a floating body which is provided in the vicinity of a rotating optical recording medium and which is made afloat by an air stream created by the rotation of the recording medium, an objective lens which is fitted in an optical path forming aperture in the floating body and which permits converging light from a light source to be focused on a focusing plane of the recording medium, and a coil which is installed in the vicinity of the optical path forming aperture in the floating body and which forms a magnetic field toward the focusing plane of the recording medium. The floating body is made of a soft magnetic material and is provided with a rim made of a soft magnetic material which is formed along the peripheral edge of the optical path forming aperture on the side closer to the optical recording medium and which projects toward the same. The rim is tapered in such a way that its wall thickness decreases gradually toward the center of the optical path forming aperture.

7 Claims, 22 Drawing Sheets

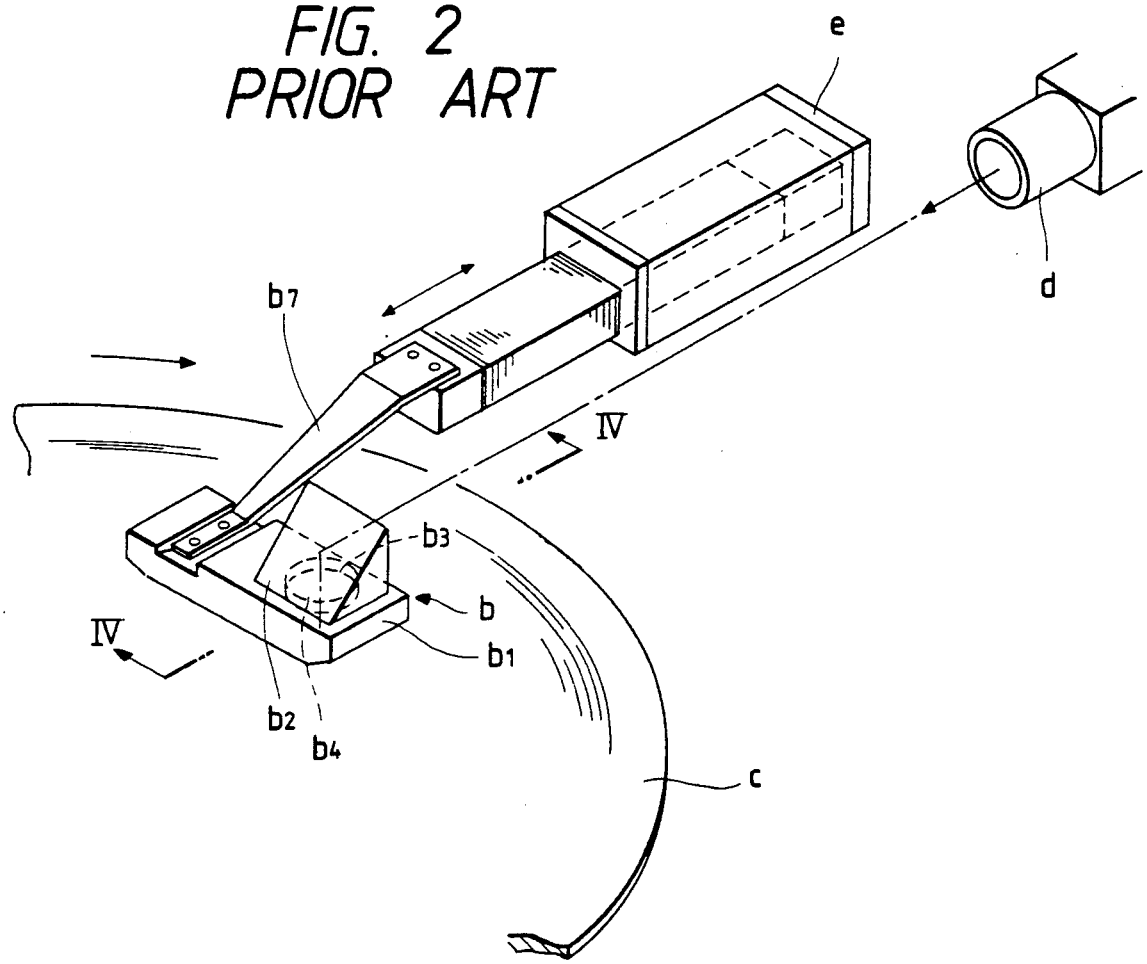

FLOATING HEAD FOR USE WITH A RECORDING APPARATUS OF MAGNETO-OPTICAL MEMORY DEVICE

BACKGROUND OF THE INVENTION

1. Field of the Invention

The present invention relates to a floating head for use with a recording apparatus of magneto-optical memory type. More particularly, the present invention relates to an improved floating head with which a vertical magnetic field can be efficiently concentrated on an optical recording medium at the focusing point of converging light.

2. Description of the Related Art

The principle of recording and erasure with an apparatus of magneto-optical memory type is described below with reference to FIGS. 1(A)–1(C). As shown in FIG. 1(A), a recording film a made of a magnetic material is illuminated with a spot of laser beam, with a magnetic field being applied in the direction indicated by fine arrows; whereupon the direction of magnetization in the illuminated area is reversed to change the polarization angle resulting from the Kerr effect, with the resulting change being used to record and reproduce information of interest (see FIG. 1(B)). When a spot of laser beam is applied to the recording area of film a, with a magnetic field being applied in a direction opposite the direction in the recording mode as shown in FIG. 1(C), whereupon the direction of magnetization in the illuminated area is restored to the initial state so as to erase the recorded information.

An optical head is necessary to record, reproduce and erase information in the recording apparatus of magneto-optical memory type and it is known to use a floating head as described in Japanese Patent Application Unexamined Publication No. Sho. 60-261052. As shown in FIGS. 2-4, the main part of a floating head generally indicated by b comprises an air slider that is formed of a soft magnetic material and which is made afloat by an air stream produced by the rotation of an optical recording medium c, a prism b2 that is installed on the air slider b1 and which permits laser light from a light source d such as a semiconductor laser to be reflected toward the recording medium c, an objective lens b4 that is fitted in an optical path forming aperture in the air slider b1 and which permits the reflected laser light from the prism b2 to converge on the focusing plane of the recording medium c, and turns of a coil b6 that are placed within a groove b5 formed around the aperture b3 on the side of the air slider b1 that is the closer to the recording medium c and which form a generally perpendicular magnetic field with respect to the focusing plane of the recording medium c. The head is provided in the vicinity of the recording medium c and supported with a suspension in spring form b7 that is moved radially of the recording medium c by means of a drive unit e.

The floating head b which has a minimum number of components including the prism b2, objective lens b4 and coil b6 mounted on the air slider b1 has the advantages of light weight and shorter access time. Further, the air slider b1 which is made afloat by an air stream created by the rotation of the recording medium c is capable of maintaining a constant distance from the recording medium c, thereby eliminating the need of using a mechanism for focusing the laser light passing through the objective lens b4.

The floating head b described above has several disadvantages. Since the air slider b1 is totally made of a soft magnetic material, magnetic paths are formed on opposite sides of the coil b6 as shown in FIGS. 5 and 6, with one magnetic path being formed on the side of the air slider b1 that is the closer to the aperture b3 and the other on the far side of the slider, and this makes it difficult to concentrate, via air, the generated magnetic field on the recording medium c at the focusing point $\alpha$ of laser light. As a result, an extremely great magnetizing force has to be applied to produce a magnetic field of 200–300 Oe on the focusing plane of the recording medium c that is necessary to perform effective magneto-optical recording or erasure. Conventionally, this need has been met by increasing the number of turns of the coil b6. However, as the number of turns of the coil b6 is increased, its self-inductance also increases to make it difficult to reverse the direction of an applied magnetic field at high speed for image recording or erasure and this has led to a slower recording or rewriting speed.

As described in Japanese Patent Application Unexamined Publication No. Sho. 61-71437, the concentration of a vertical magnetic field may be enhanced by providing a soft magnetic layer on the underside of the recording film in the optical recording medium so as to form magnetic paths between the soft magnetic layer and the coil. However, this idea has proved still insufficient to concentrate a magnetic field toward the point on the recording medium of which laser light is to be focused.

SUMMARY OF THE INVENTION

The present invention has been accomplished under these circumstances and has as an object providing a floating head with which a vertical magnetic field can be efficiently concentrated on an optical recording medium at the focusing point of converting light.

A floating head for use with a recording apparatus of magneto-optical memory type according to the present invention comprises the following a floating body that is provided in the vicinity of a rotating optical recording medium and that is made afloat by an air stream created by the rotation of said recording medium; an objective lens that is fitted in an optical path forming aperture in the floating body and which permits converging light from a light source to be focused on the focusing plane of the recording medium; and a magnetic field generating means that is installed in the floating body near the optical path forming aperture and which forms a magnetic field that is directed toward the focusing plane of the recording medium, the converging light being focused on the focusing plane of the recording medium to record or erase information, with a magnetic field being created by the magnetic field generating means. The floating head is characterized in that the floating body is made of a soft magnetic material and is provided with a rim made of soft magnetic material that is formed along the peripheral edge of said optical path forming aperture on the side that is the closer to the optical recording medium and which projects toward the same.

In the present invention, both the floating body and the rim are made of a soft magnetic material such as a Mn-Zn ferrite, Ni-Zn ferrite, Permally or some other materials that are commonly used in the prior art. The floating body may be formed of the same or different soft magnetic material than the rim. If the floating body and the rim are to be made of different soft magnetic materials, the rim is desirably made of a soft magnetic material having a higher permeability than the floating body.

BRIEF DESCRIPTION OF THE DRAWINGS

FIG. 2 is a perspective view of a prior art floating head for use with a magneto-optical memory type recording apparatus;

DETAILED DESCRIPTION OF THE PREFERRED EMBODIMENTS

Seven embodiments of the present invention are described below in detail with reference to FIGS. 7-32.

FIRST EMBODIMENT

Figure 1A:
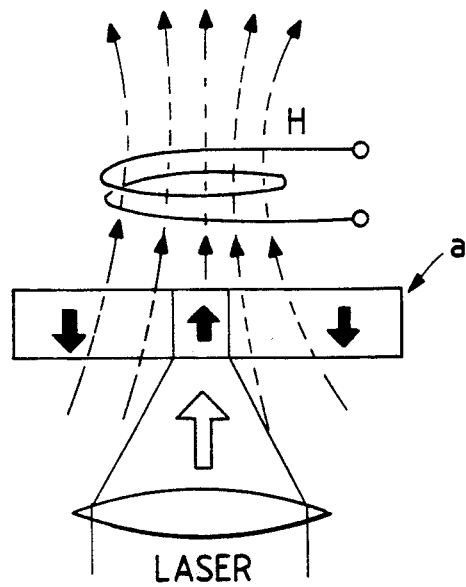
FIGS. 1(A)-1(C) are diagrams illustrating the principle of recording and erasure with a magneto-optical memory type recording apparatus.
Figure 1B:
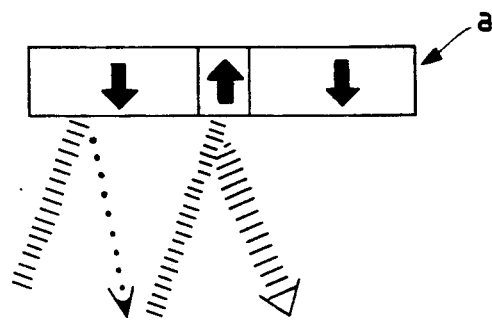
Figure 1C:
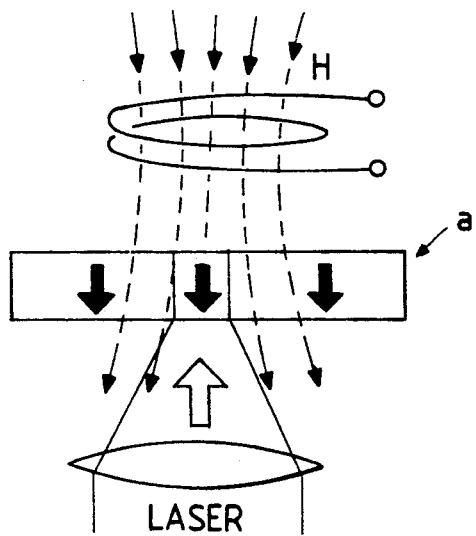
Figure 3:
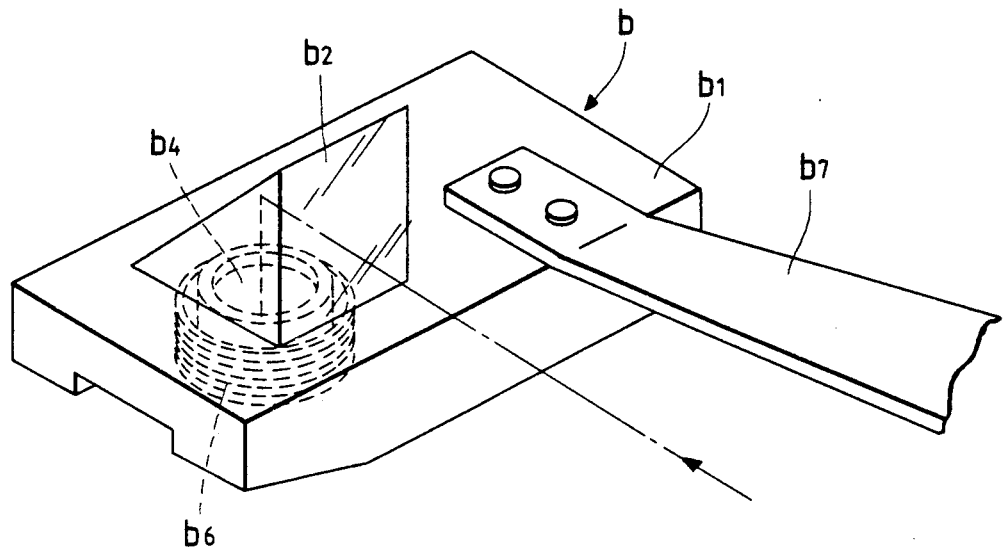
FIG. 3 is a perspective view showing an enlarged part of the prior art floating head.
Figure 4:
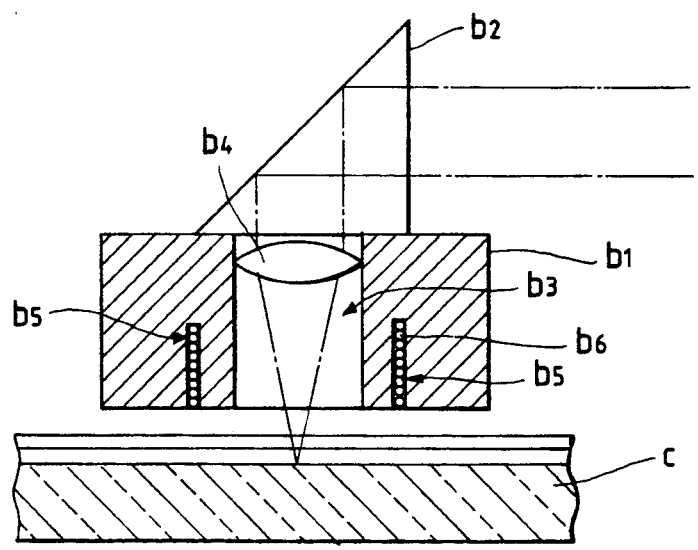
FIG. 4 is a cross section taken on line IV—IV of FIG. 2.
Figure 5:
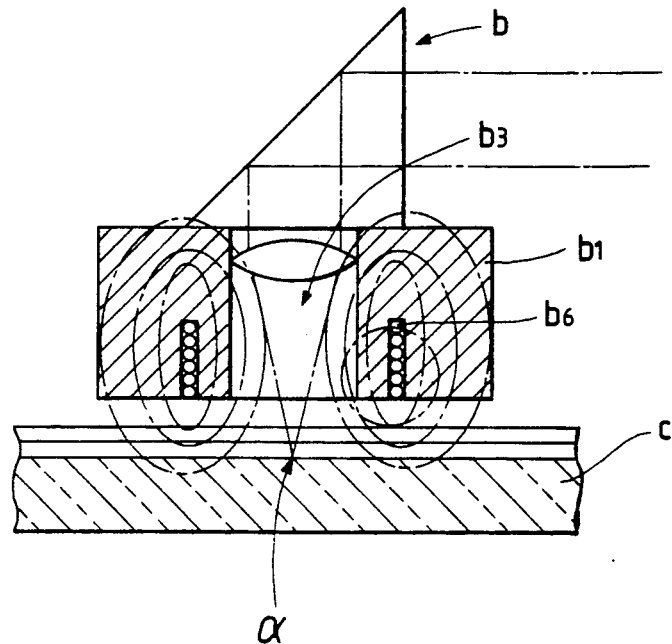
FIG. 5 is a diagram illustrating the operation of the prior art floating head.
Figure 6:
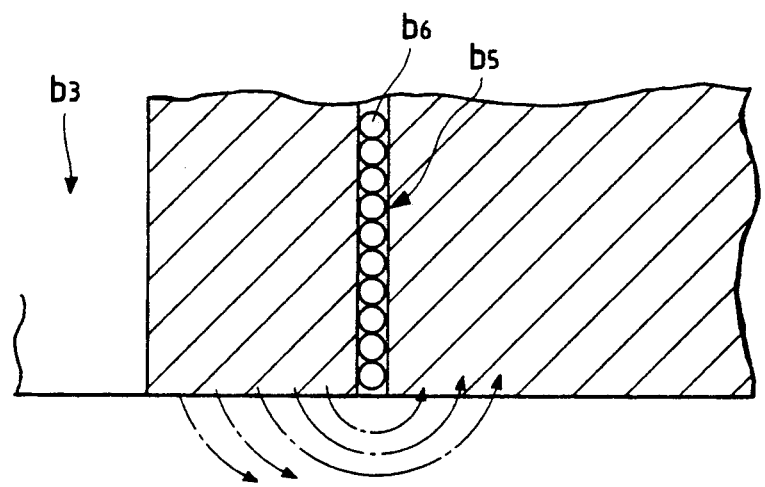
FIG. 6 is a partial enlarged view of FIG. 5.
Figure 7:
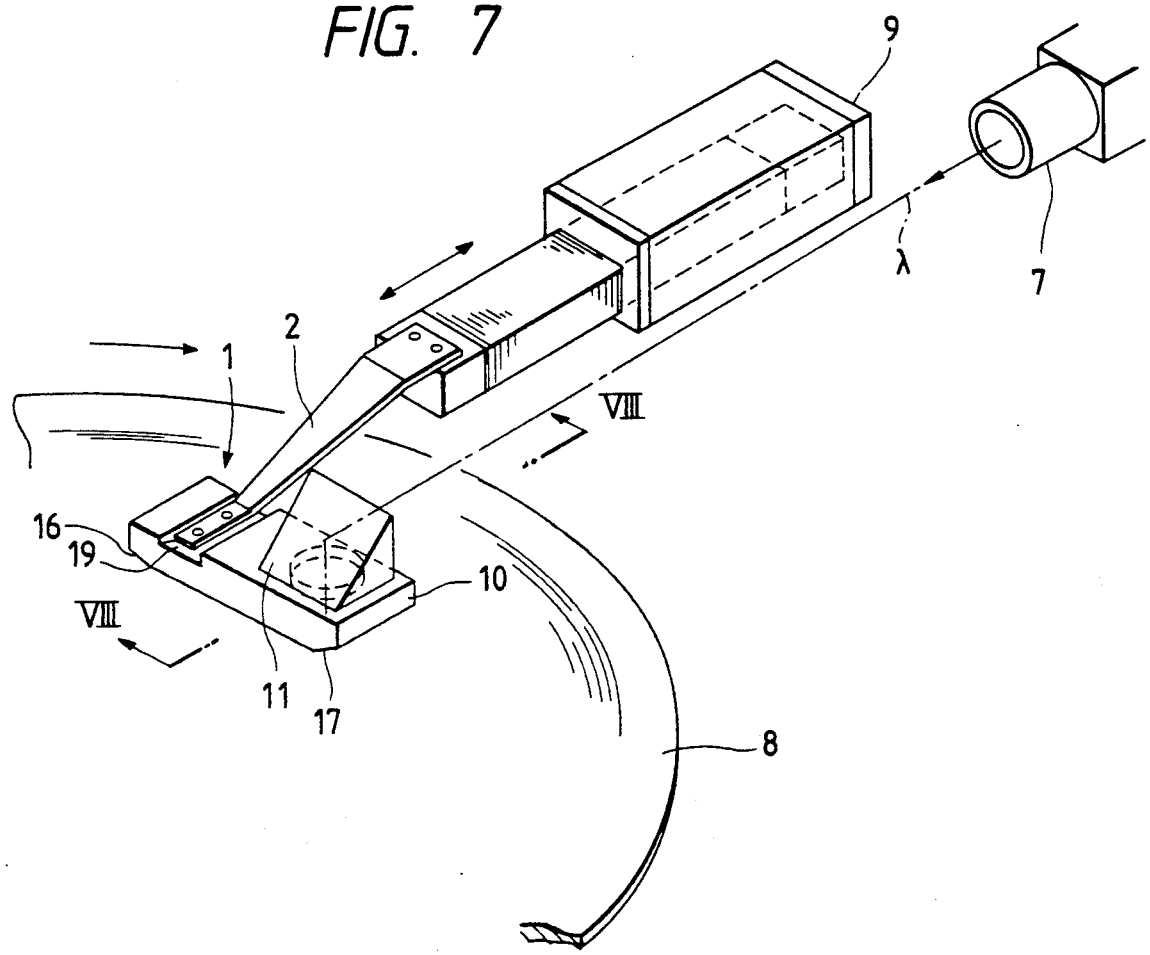
FIG. 7 is a perspective view of a floating head according to the first embodiment.
Figure 8:
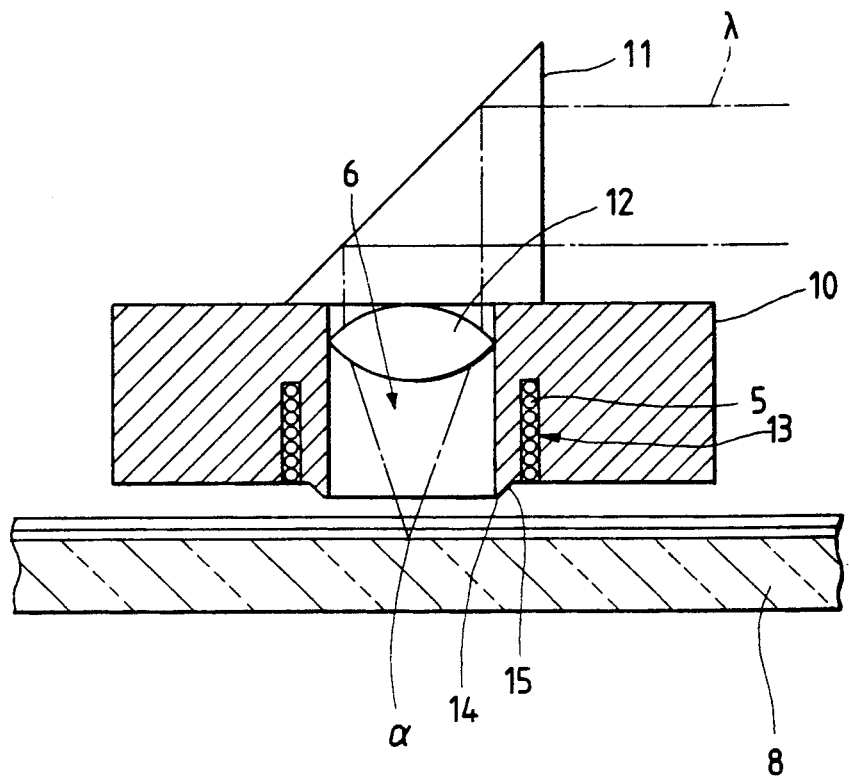
FIG. 8 is a cross section taken on line VIII—VIII of FIG. 7.
Figure 9:
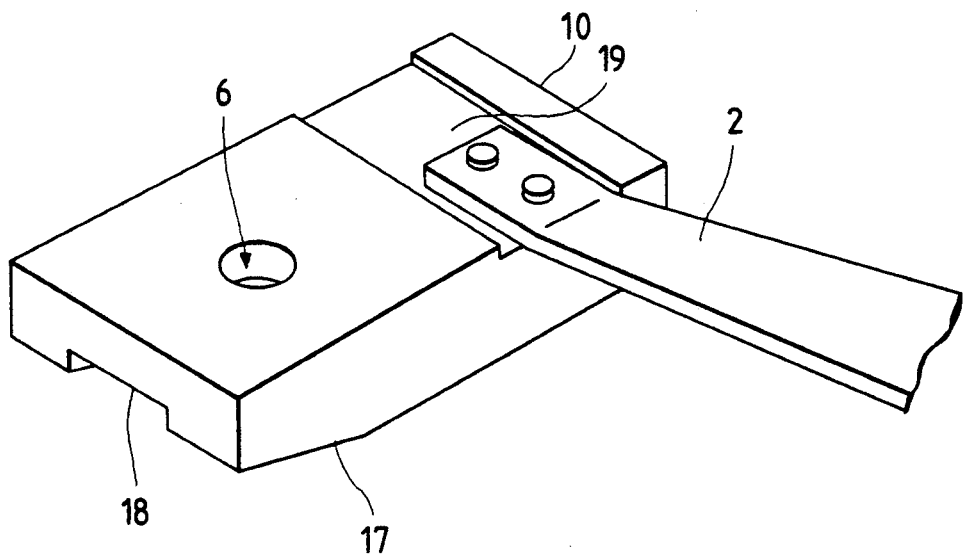
FIG. 9 is a perspective view of the floating head, with part taken away.

As shown in FIGS. 7-9, the main part of a floating head according to the first embodiment which is generally indicated by 1 comprises a floating body 10 supported by a suspension in spring form 2, a coil 5 as a magnetic field generating means the turns of which are placed within a receiving groove 13 in the floating body 10, an objective lens 12 provided in an optical path forming aperture 6 in the floating body 10, a prism 11 provided above the aperture 6, and a rim 15 that has a tapered portion 14 and which is formed along the peripheral edge of the aperture 6.

The floating body 10 is made of Mn-Zn ferrite and, as shown in FIG. 7, its bottom side is provided with tapers 16 and 17 that permit air to enter at one end and exit from the other end smoothly. The bottom of the floating body 10 is also provided with a central relief 18 that stabilizes the head 1 as it turns afloat (see FIG. 9).

The optical path forming aperture 6 is bored through the generally central part of the floating body 10 which, as shown in FIG. 8, guides laser light ($\lambda$) from a semiconductor laser 7 as a light source to be incident on a magneto-optical disk 8. The optical path forming aperture 6 has a rim 15 that is formed around its peripheral edge and which projects slightly toward the magneto-optical disk 8. The rim 15 is integral with the floating body 10 and is made of the same material as the latter. The rim 15 has a tapered portion 14 of such a shape that its wall thickness decreases gradually toward the center of the optical path forming aperture (namely, toward the magneto-optical disk).

The prism 11 installed above the optical path forming aperture 6 in the floating body 10 is made of a glass material such as BK 7 and permits laser light ($\lambda$) from the semiconductor laser 7 to be reflected toward the magneto-optical disk 8. The objective lens 12 is fitted in the optical path forming aperture 6 on the side that is adjacent the prism 11.

The foremost end of the suspension in spring form 2 which is connected at the base end to a drive unit 9 is installed in a recess 19 in the floating body 10, whereby the floating head 1 according to the first embodiment of the present invention is provided in a predetermined position. The drive unit 9 is typically composed of a voice coil motor and in response to a control signal such as a tracking error signal which it receives, the drive unit 9 controls the floating head 1 on the suspension 2 to move to a desired track on the magneto-optical disk 8.

The floating head 1 having the construction described above is operated in the following manner. As the magneto-optical disk 8 rotates, the floating body 10 becomes afloat by a height of about 1 μm and, as shown in FIGS. 7 and 8, laser light (λ) issuing from the semiconductor laser 7 parallel to the direction of movement of the drive unit 9 is admitted into the prism 11 and passes through the objective lens 12 to be focused on the focusing plane of the magneto-optical disk 8. At the same time, an electric current is applied to the coil 5 that is located within the receiving groove 13 in the floating body 10, whereupon the coil 5 produces a vertical (i.e. parallel to the optical axis of laser light) magnetic field of 200-300 Oe that is directed toward the focusing plane of the disk 8 to perform a recording operation. Alternatively, the laser light (λ) reflected from the surface of the disk 8 travels in the same optical path backward to be admitted into a photodiode (not shown) to perform a reproducing operation.

Figure 10A:
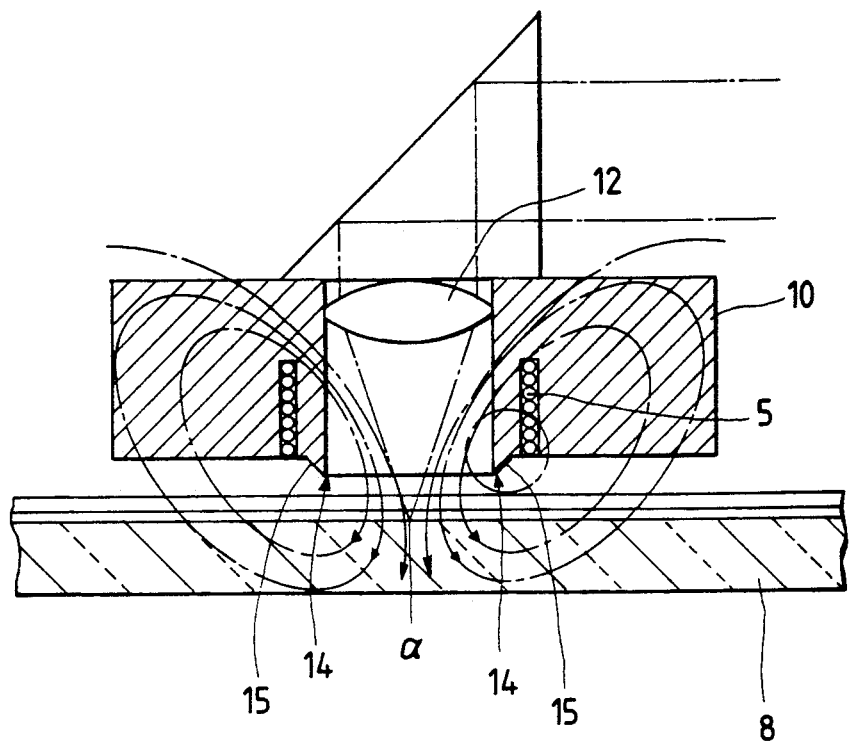
FIG. 10(A) is a diagram illustrating the operation of the floating head.
Figure 10B:
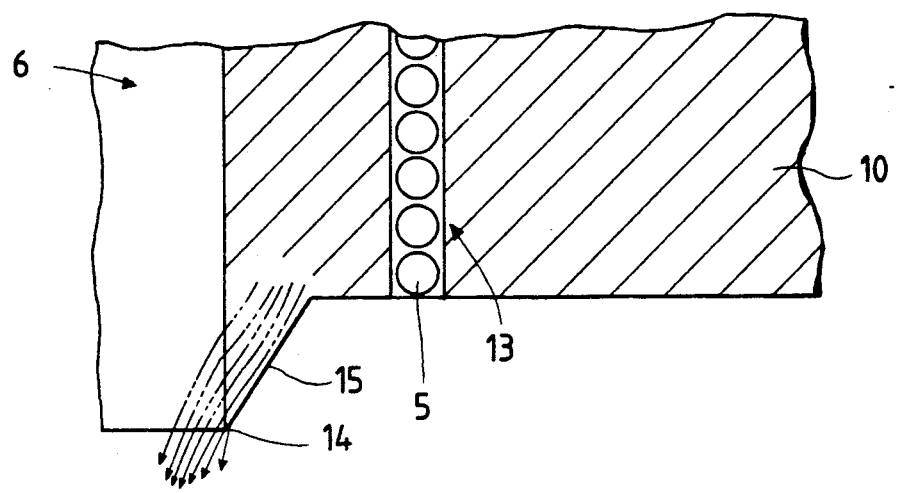
FIG. 10(B) is a partial enlarged view of FIG. 10(A)

In the floating head 1 according to the first embodiment under discussion, the floating body 10 has the rim 15 that is formed along the peripheral edge of the optical path forming aperture 6 and which projects slightly toward the magneto-optical disk 8, and this rim 15 has the tapered portion 14 of such a shape that its wall thickness decreases gradually toward the center of the aperture. Because of this arrangement, the magnetic flux issuing from the coil 5 is concentrated at the tapered portion 14 of the rim 15, whereby the generated magnetic field can be concentrated toward portion α on the magneto-optical disk 8 at which laser light is focused, as shown in FIGS. 10(A) and 10(B).

Therefore, even in the absence of as great a magnetizing force as has been needed in the prior art, a magnetic field of 200-300 Oe that is necessary in magneto-optical recording or erasure can be formed on the focusing plane of the disk 8, whereby not only the number of turns of coil 5 mounted on the floating head 1 but also the current to be supplied to the coil can be reduced.

As a result, the self-inductance of the coil 5 is sufficiently reduced to enable the direction of an applied magnetic field to be reversed at high speed in an information recording or erasure mode, leading to the advantage of increased writing or rewriting speed.

Figure 11A:
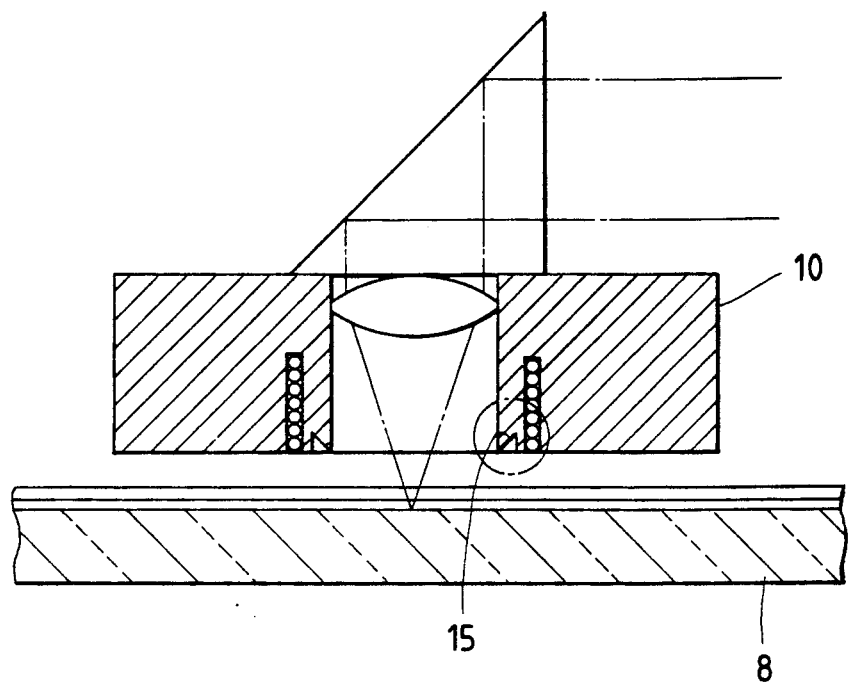
FIG. 11(A) is a cross section of a floating head according to a modification of the first embodiment.
Figure 11B:
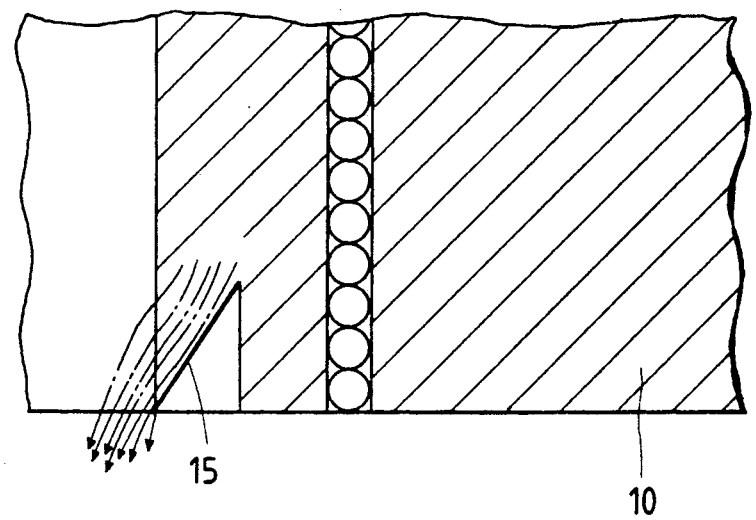
FIG. 11(B) is a partial enlarged view of FIG. 11(A)

In the first embodiment described above, the rim 15 is formed in such a way that it projects slightly from the bottom of the floating body 10 toward the magneto-optical disk 8 but, needless to say, in order to further enhance the stability of the head 1 as it runs afloat, the rim 15 may be so formed that it will not project from the bottom of the floating body 10 as shown in FIGS. 11(A) and 11(B).

SECOND EMBODIMENT

Figure 12:
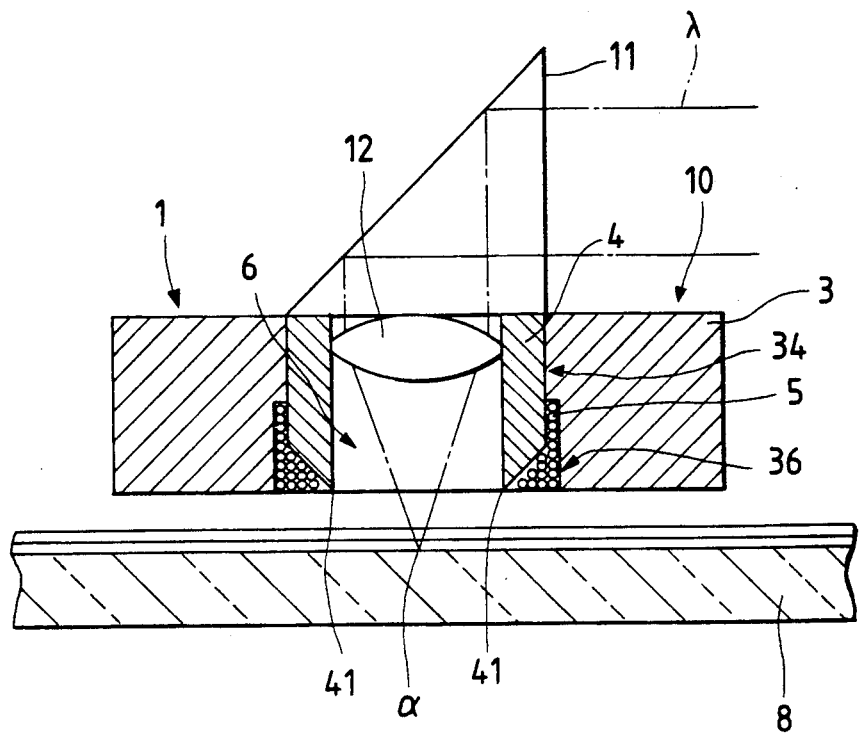
FIG. 12 is a cross section of a floating head according to the second embodiment.
Figure 13:
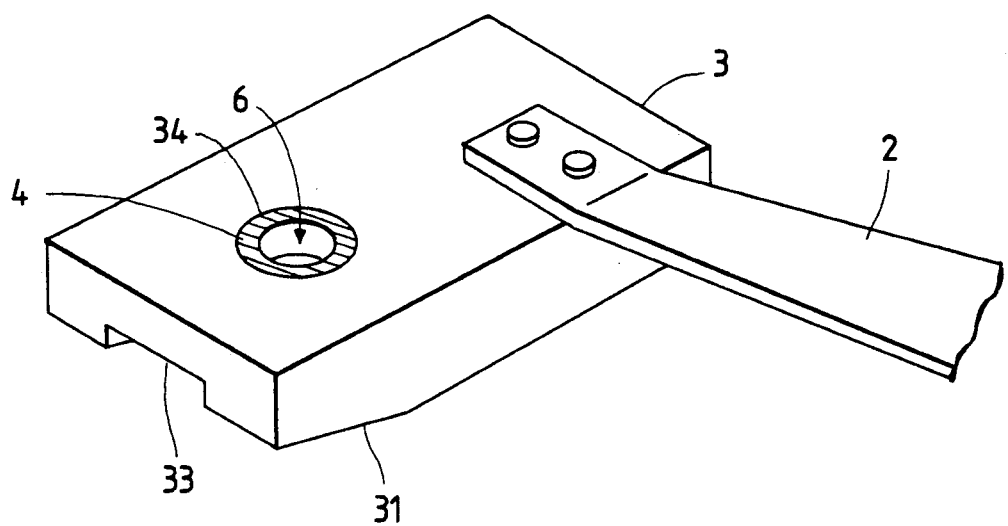
FIG. 13 is a perspective view of the floating head, with part taken away.

As shown in FIGS. 12 and 13, the main part of a floating head according to the second embodiment which is generally indicated by 1 comprises an outer element 3 supported by a suspension in spring form 2, an annular inner element 4 fitted into the outer element 3, and a tapered portion 41 provided on the side of the inner element 4 which faces a magneto-optical disk 8.

The outer element 3 of the floating body 1 is made of glassy carbon and, as shown in FIG. 13, its bottom side is provided with a taper 31 that permits air to enter at one end and exit from the other end smoothly. The bottom of the floating head 1 is also provided with a central relief 33 that stabilizes the head 1 as it runs afloat. Further, as shown in FIG. 13, an opening 34 into which the inner element 4 is to be installed is bored through the outer element 3 in the central area on the side where air flows out. As shown in FIG. 12, a receiving groove 36 into which a coil 5 as a magnetic field generating means is to be placed is formed in the lower part of the opening 34 on its inside surface. Further, the outer element 3 may be formed of valium titanate, calcium titanate or ceramics. Using non-magnetic materials such as calcium titanate and ceramics has the advantage that the floating body made of these materials is easy to work. The use of nonmagnetic materials having a lubricating action such as glassy carbon has the advantage of reducing the friction that occurs between the floating body made of these materials and the optical recording medium when they contact each other.

The inner element 4 is made of Mn-Zn ferrite in an annular form and fitted into the opening 34 in the outer element 3 with an adhesive put on its inside surface. The annular space within the element 4 serves as an optical path forming aperture 6. Further, the inner element 4 may be formed Ni-Zn ferrite or permalloy.

As in the first embodiment of the present invention, the tapered portion of the inner element which is provided on the side that is the closer to the optical recording medium may slightly project from the bottom of the floating body toward the recording medium by an amount that will not prevent the head from running afloat. If the thickness of the inner element is set to have a great dimension, the angle of taper is desirably set at a smaller value than when the inner element has a smaller thickness in order to insure that a magnetic field will be concentrated at the focusing point on the recording medium.

Turns of coil are wound around the inner element 4 in the area that corresponds to the groove 36 in the outer element 3, and a tapered portion 41 that has such a shape that its wall thickness decreases gradually toward the center of the aperture 6 is provided on the side of the inner element 4 that is the closer to a magneto-optical disk 8.

A prism 11 is installed above the inner element 4 fitted into the outer element 3 and this prism which is made of a glass material such as BK 7 permits laser light from a semiconductor laser to be reflected toward the magneto-optical disk 8. An objective lens 12 is fitted in the optical path forming aperture 6 in the inner element 4 on the side where it is adjacent the prism 11.

As in the first embodiment, the foremost end of the suspension in spring form 2 which is connected at the base to a drive unit is installed on the outer element 3 in such a way that the floating head 1 is provided in a predetermined position.

The floating head 1 having the construction described above is operated in the following manner. As the magneto-optical disk 8 rotates, the floating body 10 composed of the outer element 3 and the inner element 4 becomes afloat by a height of about 1 μm and laser light (λ) from the semiconductor laser is admitted into the prism 11 and passes through the objective lens 12 to be focused on the focusing plane of the magneto-optical disk 8. At the same time, an electric current is applied to the coil 5 that is positioned beneath the objective lens 12 and which is wound around the inner element 4, when upon the coil 5 produces a vertical magnetic field of 200-300 Oe that is directed toward the focusing plane of the disk 8 to perform a recording operation. Alternatively, the laser light (λ) reflected from the surface of the disk 8 travels in the same optical path backward to be admitted into a photodiode (not shown) to perform a reproducing operation.

Figure 14A:
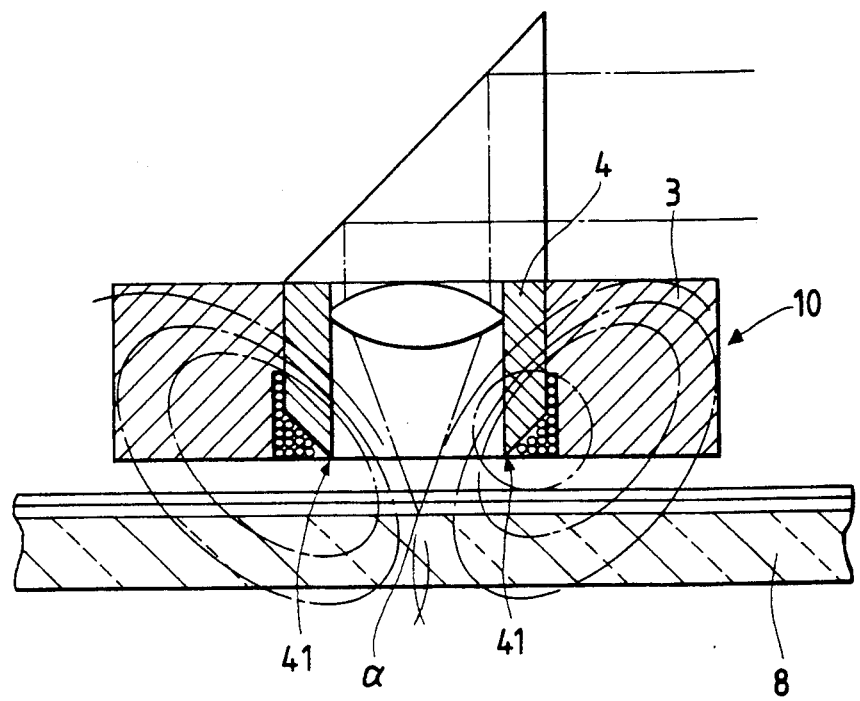
FIG. 14(A) is a diagram illustrating the operation of the floating head.
Figure 14B:
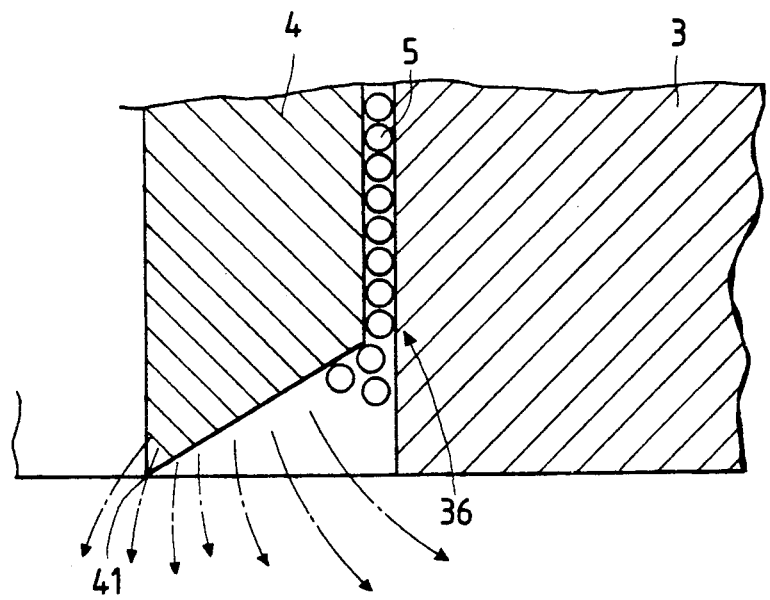
FIG. 14(B) is a partial enlarged view of FIG. 14(A)

In the floating head 1 according to the second embodiment under discussion, the floating body 10 is composed of the inner element 4 that is formed on Mn-Zn ferrite and which has the optical path forming aperture 6, and the outer element 3 that is formed of glassy carbon and into which the inner element 4 is fitted, so the formation of a magnetic path directed to the outer element 3 made of a non-magnetic material can be suppressed and the generated magnetic field can accordingly be concentrated toward the focusing plane of the magneto-optical disk 8 as shown in FIG. 14(A) the inner element 4 is provided with the tapered portion 41 on the side where it faces the magneto-optical disk 8, so as shown in FIG. 14(B), the magnetic flux issuing from the coil 5 is concentrated at the tapered portion 41, whereby the generated magnetic field can be concentrated toward point α on the magneto-optical disk 8 at which laser light is focused.

Therefore, even in the absence of as great a magnetizing force as has been needed in the prior art, a magnetic field of 200-300 Oe that is necessary in magneto-optical recording or erasure can be formed on the focusing plane of the disk 8, whereby not only the number of turns of coil 5 mounted on the floating head 1 but also the current to be supplied to the coil can be reduced.

As a result, the self-inductance of the coil 5 is sufficiently reduced to enable the direction of an applied magnetic field to be reversed quickly in an information recording or erasure mode, leading to the advantage of increased writing or rewriting speed.

Figure 15:
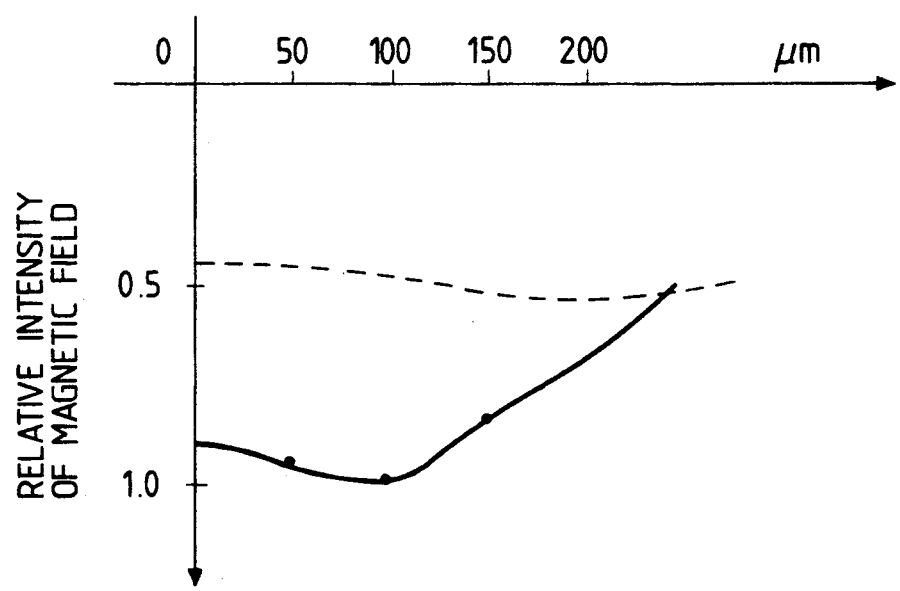
FIG. 15 is a graph showing the distribution of the relative intensity of magnetic field formed in the neighborhood of the focusing plane of a magneto-optical disk.

FIG. 15 is a graph showing the distribution of the relative intensity of magnetic field for two floating heads. The curve indicated by the solid line shows the intensity distribution formed in the neighborhood of the focusing plane of a magneto-optical disk (i.e., approximately 100 μm below the bottom of the head) with a coil that is mounted on the floating head according to the second embodiment of the present invention, and the curve indicated by the dashed line shows the intensity distribution formed near the focusing plane of a magneto-optical disk (i.e. the same position as defined above) with a coil that is mounted on a prior art floating head. The graph clearly shows that the floating head according to the second embodiment produces an increased magnetic field strength in the focusing plane on account of the concentration of the applied magnetic field in that plane. The horizontal axis of the graph shown in FIG. 15 plots the distance in micrometers from the center of a spot of laser light concentrated on the magneto-optical disk.

THIRD EMBODIMENT

Figure 16A:
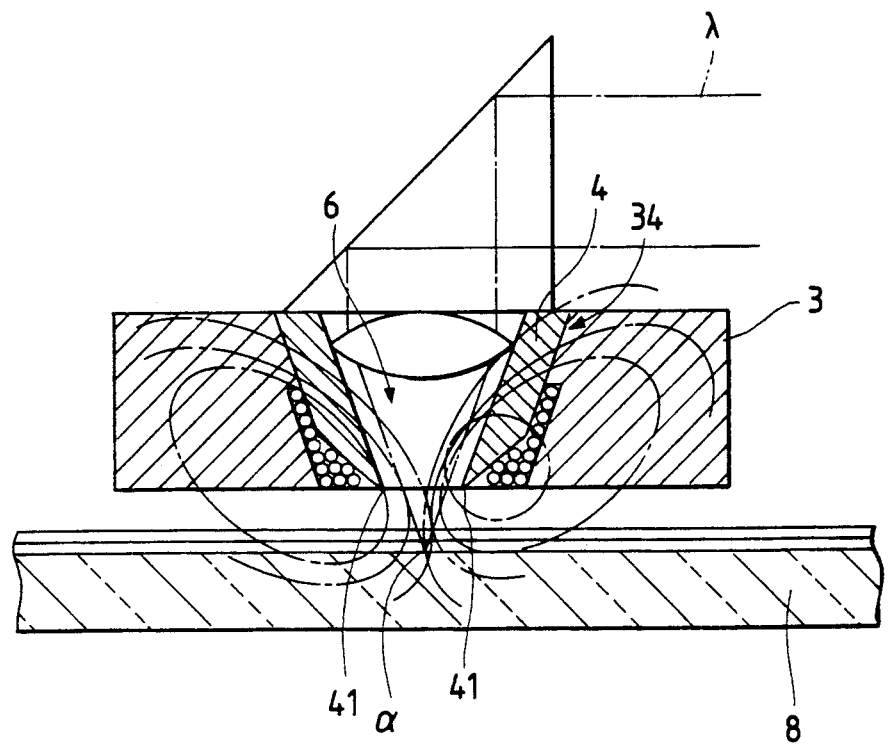
FIG. 16(A) is a cross section of a floating head according to the third embodiment.
Figure 16B:
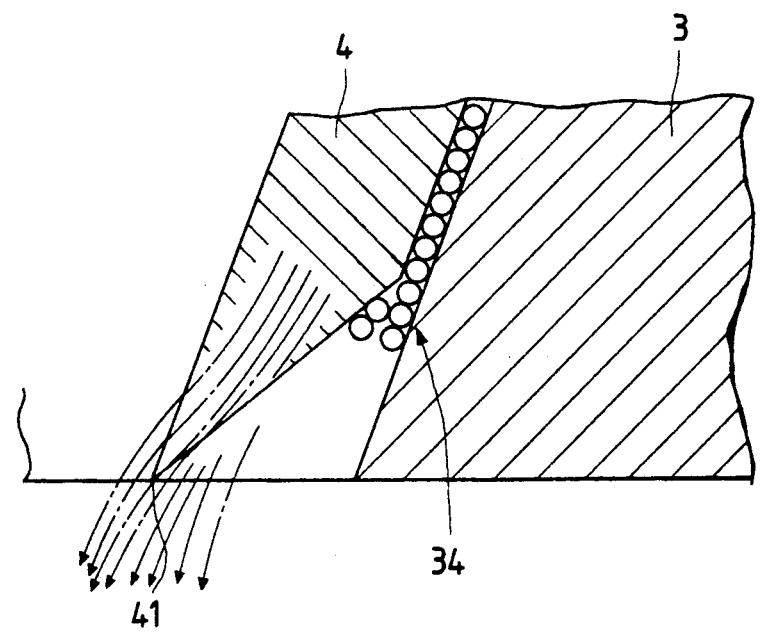
FIG. 16(B) is a partial enlarged view of FIG. 16(A)

The floating head according to the third embodiment of the present invention which is shown in FIG. 16(A) is essentially the same as the floating head of the second embodiment except for the following two points: the inside surface of the optical path forming aperture 6 in the inner element 4 slopes inward in the direction of incidence of laser light (λ), with the inclination of the slope being approximately equal to the angle of convergence of laser light (λ); and the receiving opening 34 in the outer element 3 is also provided with a slope that matches the slope of the optical path forming aperture 6.

The floating head according to the third embodiment retains the advantages of the second embodiment since it suppresses the formation of a magnetic path directed toward the outer element 3 which is made of a non-magnetic material. Further, the tapered portion 41 of the inner element 4 which is directed toward point α on the magneto-optical disk 8 where laser light is focused offers the added advantage that the magnetic flux concentrated at that tapered portion 41 (see FIG. 16(B)) permits the applied magnetic field to be further concentrated toward the focusing point α of laser light.

Figure 17:
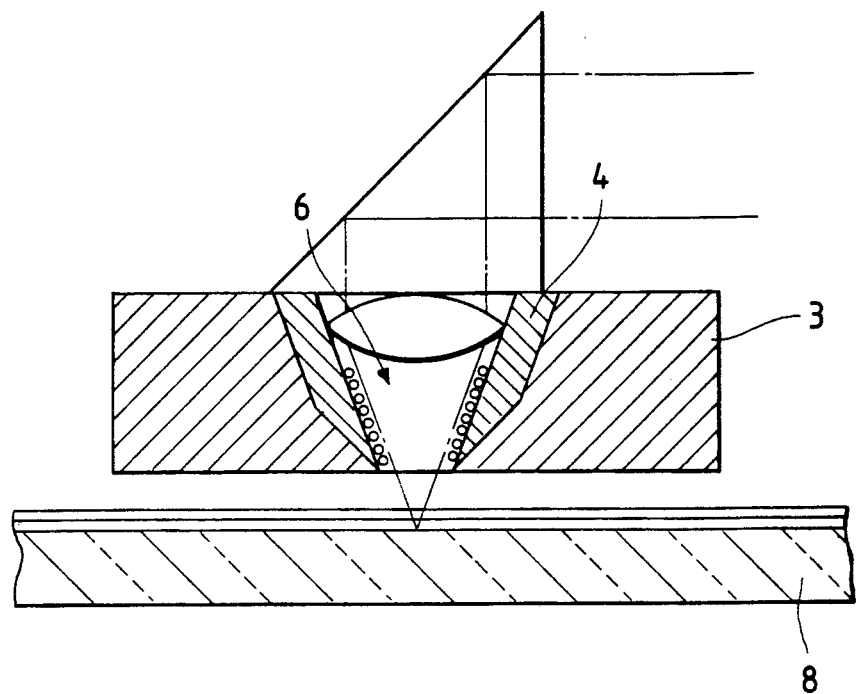
FIGS. 17 and 18 are cross sections of a floating head according to two modifications of the third embodiment.
Figure 18:
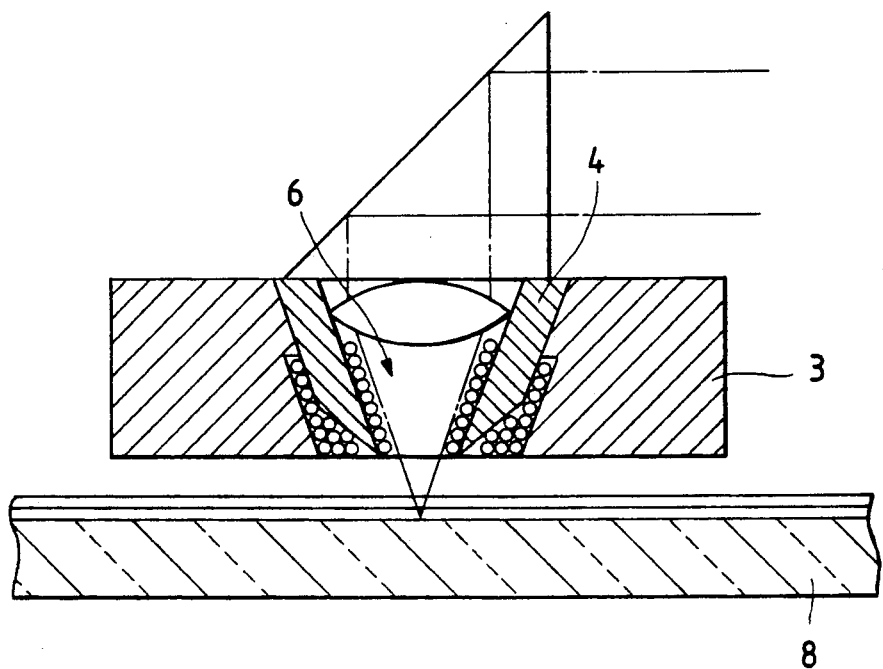

In the three embodiments described above, the coil as a magnetic field generating means is placed within the groove 13 in the floating body 10 or it is wound around the inner element 4. If desired, the coil may be installed on the inside surface of the optical path forming aperture 6 as shown in FIG. 17, or it may be installed on both the inside surface of the inner element 4 and around the inner element 4 as shown in FIG. 18.

FOURTH EMBODIMENT

Figure 19:
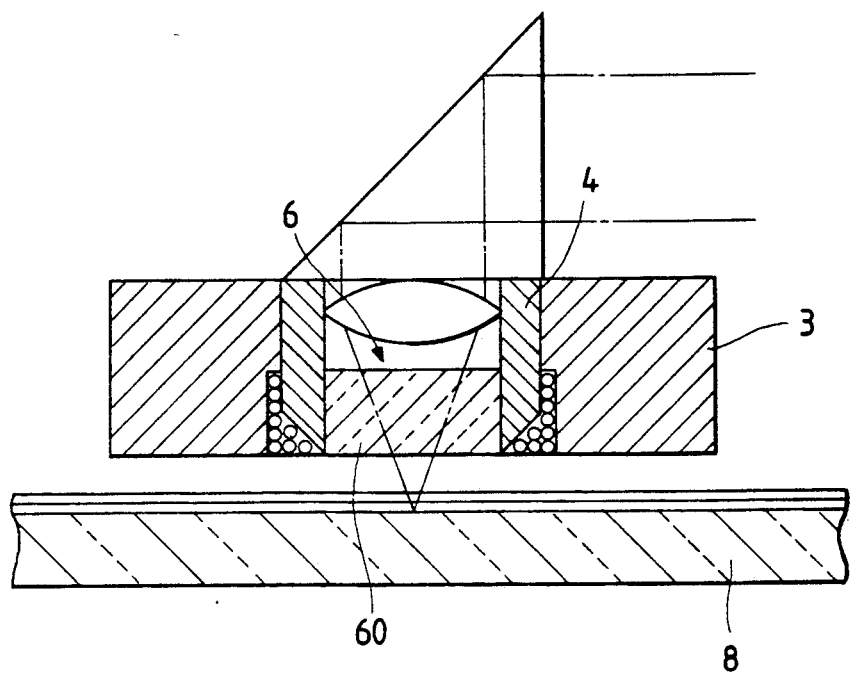
FIG. 19 is a cross section of a floating head according to the fourth embodiment.

The floating head according to the fourth embodiment of the present invention which is shown in FIG. 19 is essentially the same as the floating head of the second embodiment except that the lower part of the space within the optical path forming aperture 6 in the inner element 4 is filled with a transparent filler 60 that is made of polymethylmethacrylate (PMMA). Naturally, this floating head retains the advantages described in the discussion of the second embodiment. In addition, the transparent filler 60 with which the optical path forming aperture 6 is closed on the side that is the closer to the magneto-optical disk 8 is not only effective in stabilizing the floating head 1 as it runs afloat; the use of the transparent filler 60 also provides the following advantage.

The floating head in a recording apparatus of magneto-optical memory type usually employs an optical system that is used in recording apparatus of phase-change memory type. In such phase-change memory type recording apparatus, an optical disk 81 (see FIG. 20) is illuminated with laser light (λ) that is applied from a transparent substrate 82 so that it is focused on the surface of a recording film 83 to effect information recording or erasure. Under these circumstances, the objective lens used in the phase-change memory type recording apparatus has a focal length that takes the refractive index of the transparent substrate 82 into account. Therefore, if this objective lens is applied unmodified to the floating head for use with a magneto-optical memory type recording apparatus laser light (λ) may sometimes fail to be properly focused on the surface of the recording film.

Hence, in the fourth embodiment under discussion, the optical path forming aperture 6 is filled with the transparent filler 60 having the same refractive index as the transparent substrate 82 and this offers the advantage of solving the above-mentioned problem since laser light (λ) is guided through the transparent filler 60 to be correctly focused on the surface of the recording film 83 in the disk 8. Further, the transparent filler 60 may be formed of glass (Corning 7059).

Figure 21:
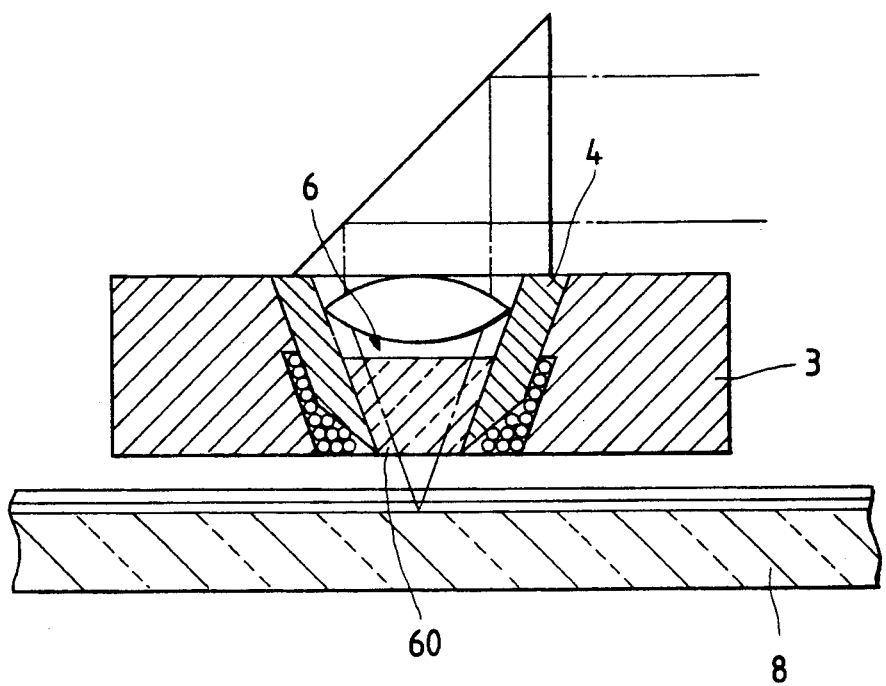
FIG. 21 is a cross section of a floating head according to a modification of the fourth embodiment.

It should also be noted that the optical path forming aperture 6 in the inner element 4 which is to be filled with the transparent filler 60 may slope as shown in FIG. 21.

FIFTH EMBODIMENT

Figure 22:
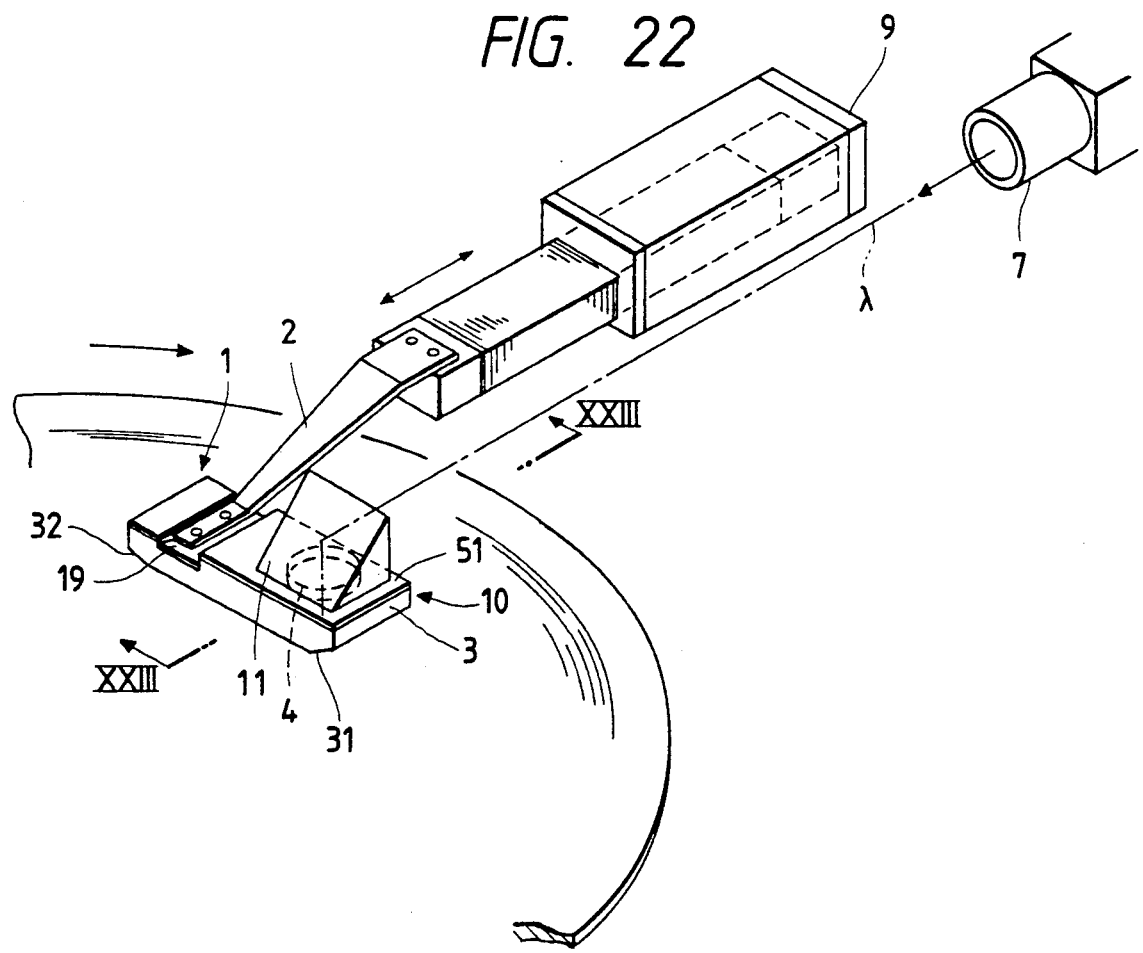
FIG. 22 is a perspective view of a floating head according to the fifth embodiment.
Figure 23:
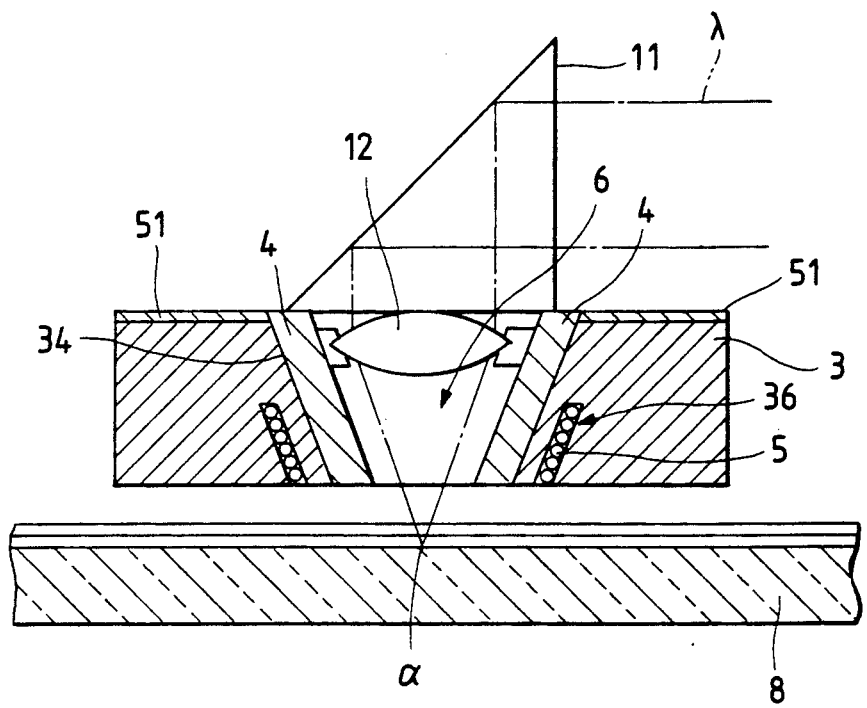
FIG. 23 is a cross section taken on line II—II of FIG. 22.
Figure 24:
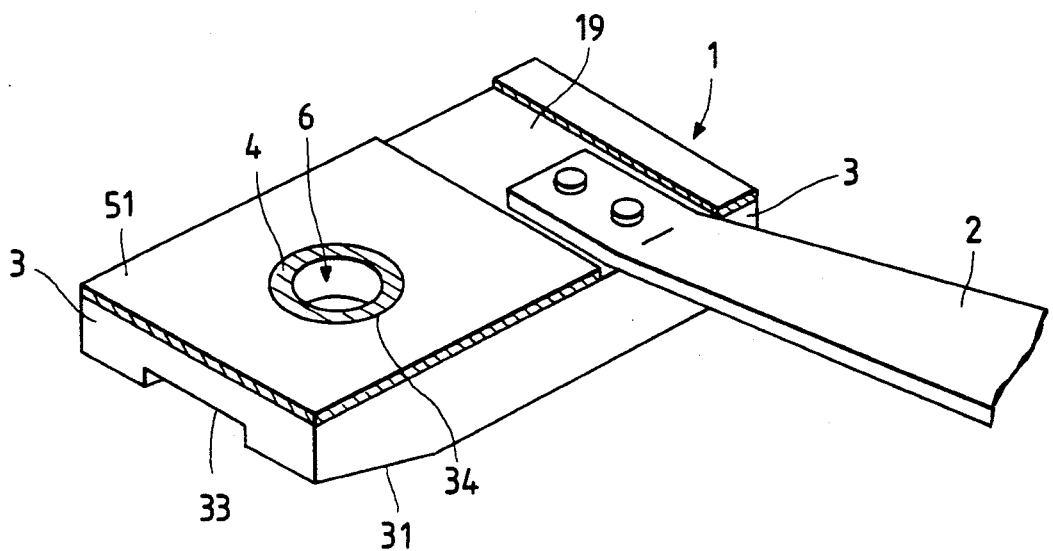
FIG. 24 is a perspective view of the floating head, with part taken away.

As shown in FIGS. 22-24, the main part of a floating head according to the fifth embodiment which is generally indicated by 1 comprises an outer element 3 supported by a suspension in spring form 2, a tubular inner element 4 fitted into the outer element 3, and a magnetic path forming portion 51 provided on the upper surface of the outer element 3.

Figure 20:
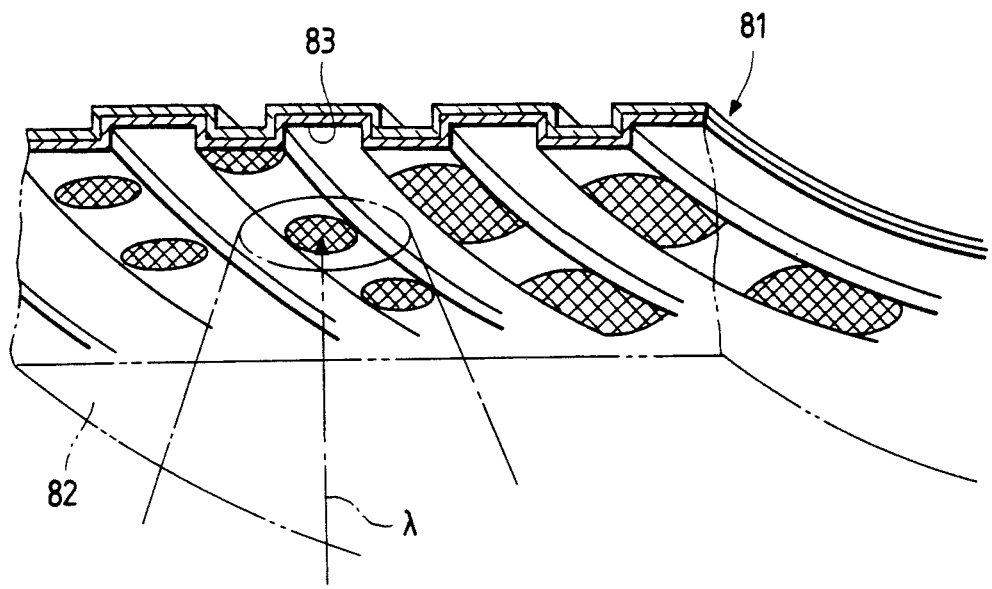
FIG. 20 is a perspective schematic view showing the bottom of an optical disk for use with a phase-change memory type recording apparatus.

The outer element 3 is made of glassy carbon and, as shown in FIG. 20, its bottom side is provided with tapers 31 and 32 that permit air to enter at one end and to exit from the other end smoothly. The bottom of the outer element 3 is also provided with a central relief 33 that stabilizes the floating head 1 as it runs afloat. As shown in FIG. 24, an opening 34 into which the inner element 4 is to be installed is formed in the central part of the side of the outer element 3 where air flows out. The inside surface of this opening is provided with a slope that matches the profile of the inner element 4 and, as shown in FIG. 23, a receiving groove 36 into which a coil 5 as a magnetic field generating means is to be installed is formed in the lower part of the opening 34 and along the inside surface of the outer element.

The inner element 4 is made of Mn-Zn ferrite in a tubular form and fitted into the opening 34 with an adhesive put on its inside surface. The tubular space within the element 4 serves as an optical path forming aperture 6 that is tapered with a slope substantially the same as the angle of convergence of laser light (λ). The entire part of the upper surface of the outer element 3 is coated with a magnetic path forming portion 51 in sheet form that is made of Mn-Zn ferrite.

Turns of coil 5 are provided within the groove 36 in the outer element 3. A prism 11 that is made of a glass material such as BK 7 and that permits laser light (λ) from a semiconductor laser 7 to be reflected toward a magneto-optical disk 8 is installed on top of the inner element 4, and an objective lens 12 is fitted in the optical path forming aperture 6 in the inner element 4 on the side where it is adjacent the prism 11.

The foremost end of the suspension in spring form 2, which is connected at the base end to a drive unit 9 is installed in a recess 19 in the floating body 10, whereby the floating head 1 according to the first embodiment of the present invention is provided in a predetermined position. The drive unit 9 is typically composed of a voice coil motor and in response to a control signal such as a tracking error signal which it receives, the drive unit 9 controls the floating head 1 on the suspension 2 to move to a desired track on the magneto-optical disk 8.

Figure 25A:
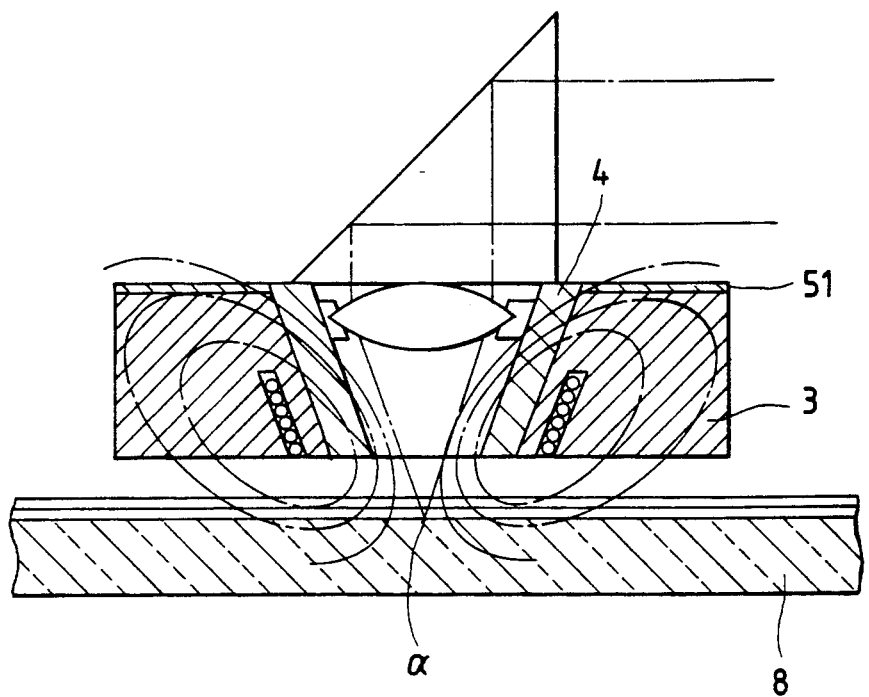
FIG. 25(A) is a diagram illustrating the operation of the floating head.
Figure 25B:
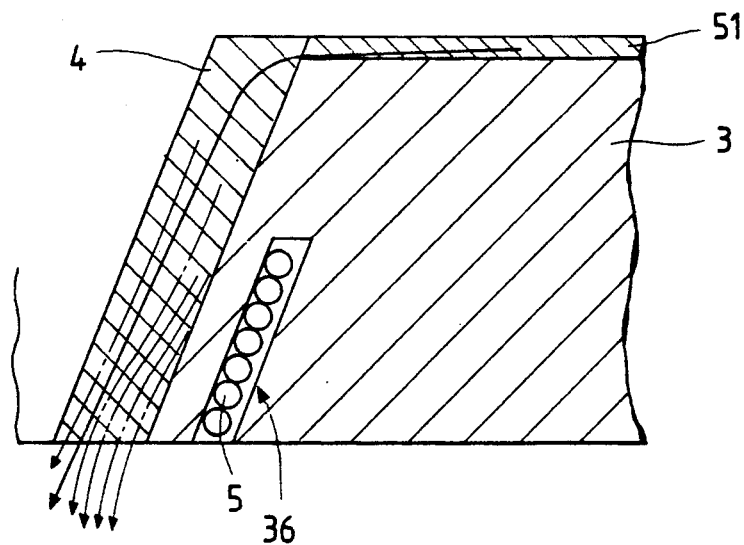
FIG. 25(B) is a partial enlarged view of FIG. 25(A)

In the floating head 1 according to the fifth embodiment under discussion, the floating body 10 is composed of the inner element 4 that is formed of Mn-Zn ferrite and which has the optical path forming aperture 6, and the outer element 3 that is formed of glassy carbon and into which the inner element 4 is fitted, so the formation of a magnetic path directed to the outer element 3 made of a non-magnetic material can be suppressed and the generated magnetic field can accordingly be concentrated toward the focusing plane of the magneto-optical disk 8 as shown in FIG. 25(A). The magnetic path forming portion 51 is made of Mn-Zn ferrite and is provided on the entire part of the top surface of the outer element 3, so as shown in FIG. 25(B), the return magnetic path that is created in the magnetic path forming portion 51 and which is directed toward the disk 8 can be provided with an increased flux. Thus, a generated magnetic field having high flux density can be concentrated toward point α on the disk 8 at which incident laser light is focused.

Therefore, even in the absence of as great a magnetizing force as has been needed in the prior art, a magnetic field of 200-300 Oe that is necessary in magneto-optical recording or erasure can be formed on the focusing plane of the disk 8, whereby not only the number of turns of coil 5 mounted on the floating head 1 but also the current to be supplied to the coil can be reduced.

Figure 26:
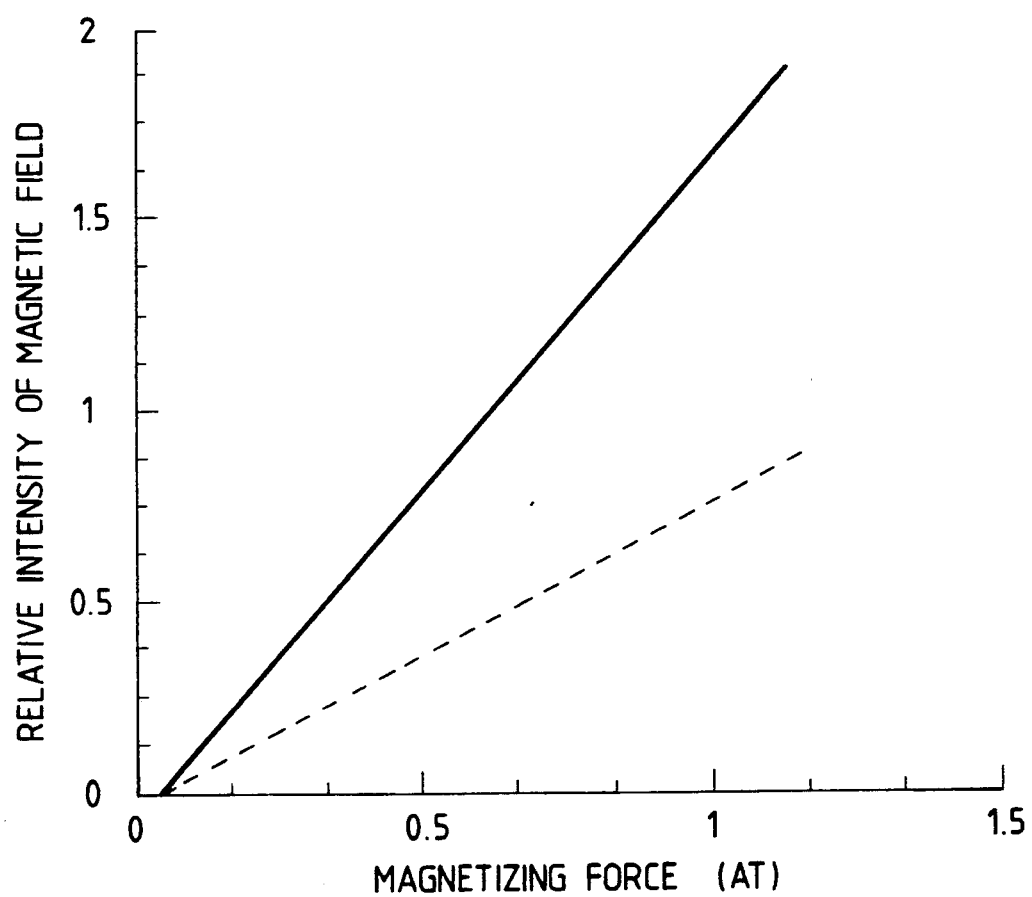
FIG. 26 is a graph showing the relationship between the magnetizing force of a coil mounted on the floating head and the relative intensity of magnetic field formed on the focusing plane of a magneto-optical disk.

FIG. 26 is a graph showing the relationship between the magnetizing force of a coil mounted on a floating head and the relative intensity of magnetic field produced on the focusing plane of a magneto-optical disk. As one can see from the graph, the floating head according to the fifth embodiment of the present invention which is indicated by the solid line is capable of attaining the intended intensity of magnetic field with about one half the magnetizing force that has to be generated with a prior art floating head that is indicated by the dashed line, whereby the direction of an applied magnetic field can be reversed at high speed with a magnetic field strength of 200-300 Oe being maintained.

Figure 27:
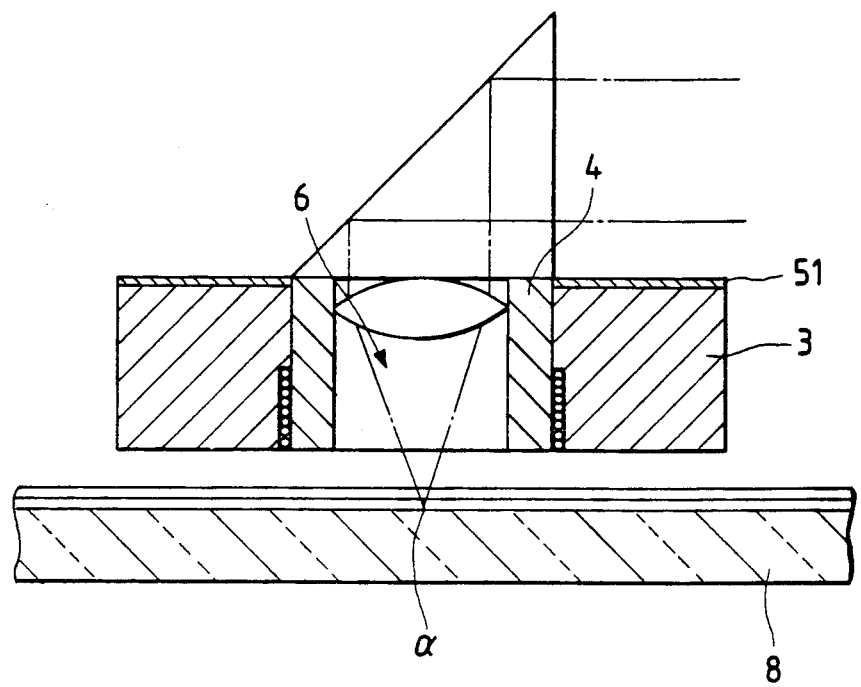
FIGS. 27 and 28 are cross sections of a floating head according to two modifications of the fifth embodiment.
Figure 28:
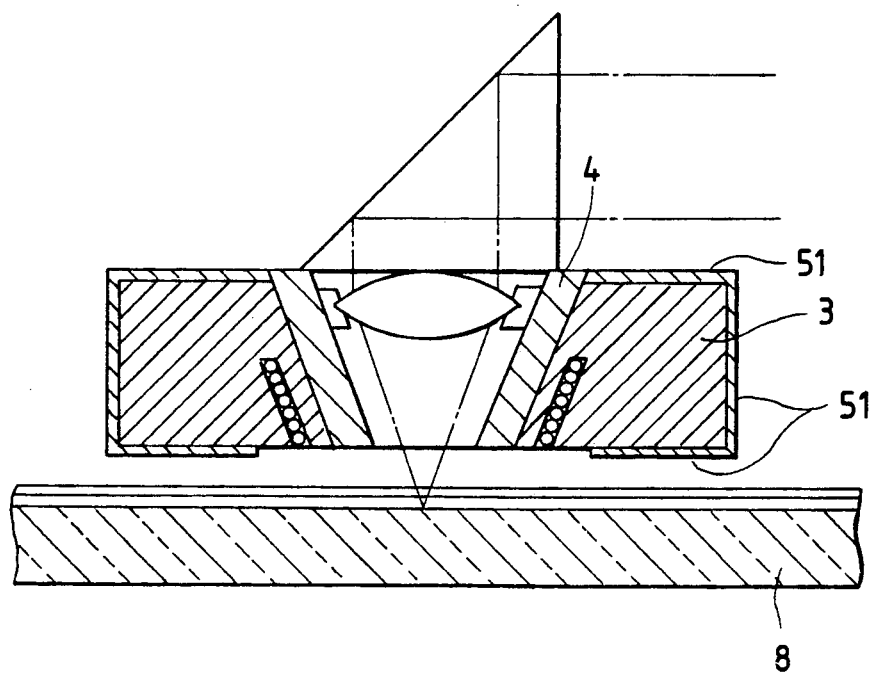

In the discussed embodiment, the optical path forming aperture 6 is provided with a slope that is substantially the same as the angle of convergence of laser light (λ). Needless to say, the concept of the present invention is also applicable to a floating head having no such slope, as shown in FIG. 27. Further, the magnetic path forming portion 51 may be formed not only on the top surface of the outer element 3 but also on the outside surfaces of its lateral and bottom sides as shown in FIG. 28. Again, it should be remembered that in order to suppress the formation of a magnetic path directed toward the outer element 3, the magnetic path forming portion 51 must not be provided on the outsie surface of the bottom side in the peripheral area of the inner element 4 where it is fitted into the outer element 3.

SIXTH EMBODIMENT

Figure 29:
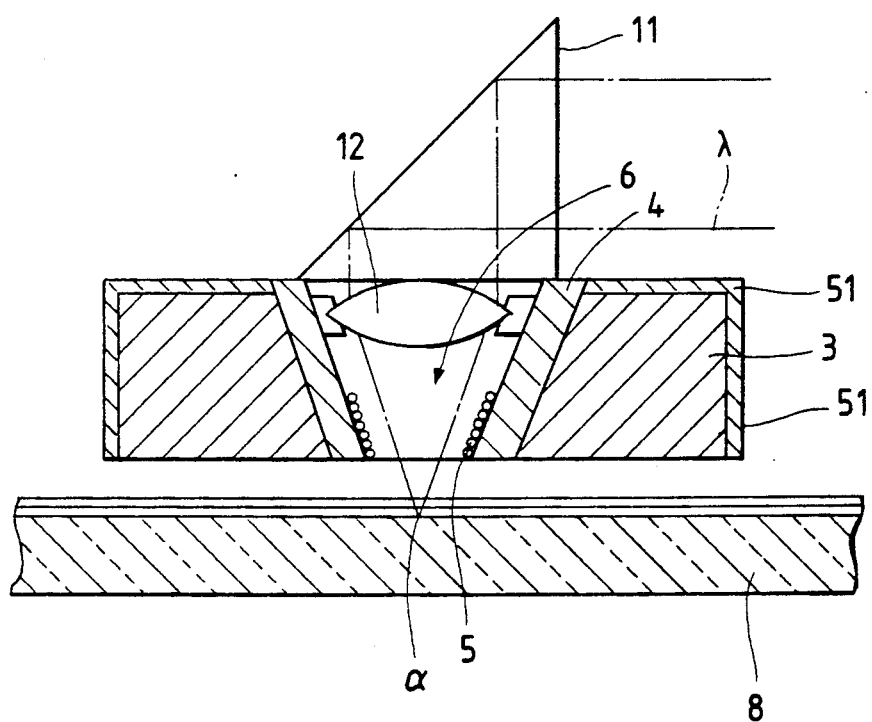
FIG. 29 is a cross section of a floating head according to the sixth embodiment.

The floating head according to the sixth embodiment of the present invention which is shown in FIG. 29 is essentially the same as the floating head of the fifth embodiment except for the following two points: the coil 5 serving as a magnetic field generating means is provided in the lower part of the inner element 4 on the inside surface of the optical path forming aperture 6; and the magnetic path forming portion 51 is also provided on the lateral outside surfaces of the outer element 3. Although not shown, an annular stopper is installed along the periphery of the bottom end of the optical path forming aperture 6 in order to prevent the coil from dropping down the aperture 6.

Figure 30A:
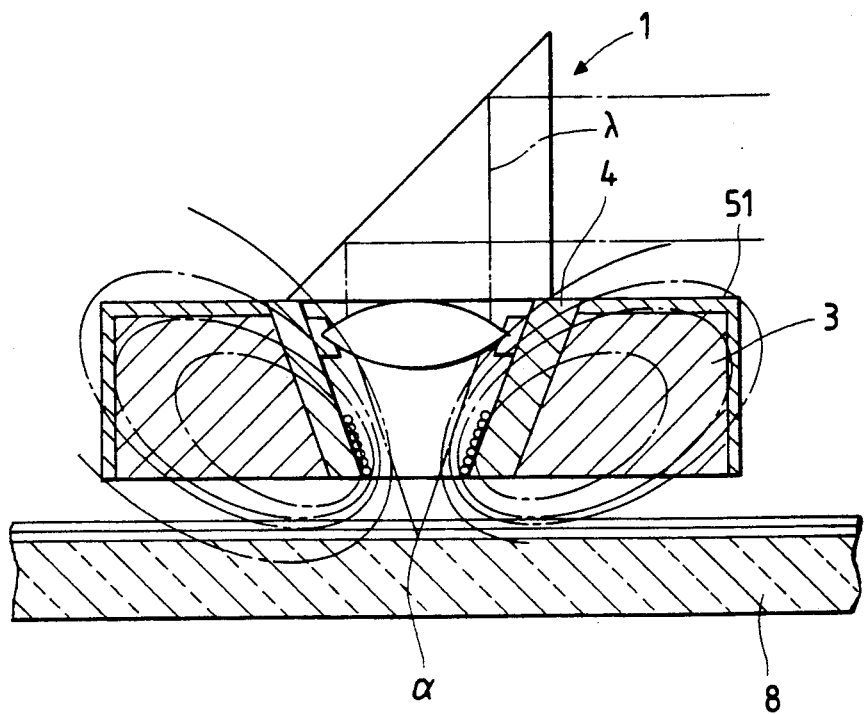
FIG. 30(A) is a diagram illustrating the operation of the floating head.
Figure 30B:
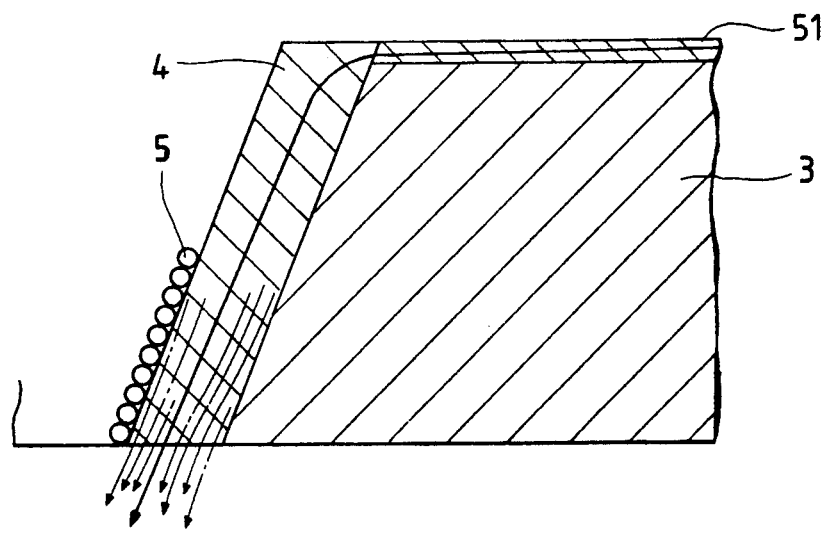
FIG. 30(B) is a partial enlarged view of FIG. 30(A)

As in the fifth embodiment, the floating head 1 shown in FIG. 29 is capable of suppressing the formation of a magnetic path directed toward the outer element 3 which is made of a non-magnetic material and the applied magnetic field can accordingly be concentrated toward the focusing plane of the magneto-optical disk 8 as shown in FIG. 30(A). Further, the Mn-Zn ferritic magnetic path forming portion 51 is provided not only on the entire surface of the top side of the outer element 3 but also on its lateral outside surfaces, so that as shown n FIG. 30(B), the return magnetic path that is created in the magnetic path forming portion 51 and which is directed toward the disk 8 can be provided with an increased flux density. In addition, the coil 5 which is provided within the optical path forming aperture 6 is even closer to the optical axis of laser light (λ) and this offers the advantage that a generated magnetic field of a higher flux density can be further concentrated toward point α on the disk 8 at which incident laser light is focused.

SEVENTH EMBODIMENT

Figure 31:
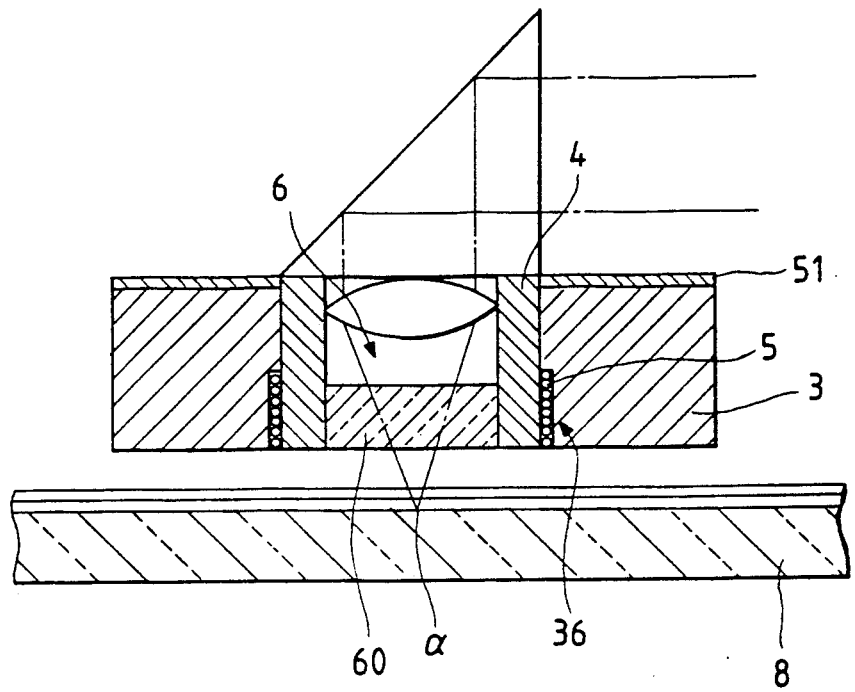
FIG. 31 is a cross section of a floating head according to the seventh embodiment.

The floating head according to the seventh embodiment of the present invention which is shown in FIG. 31 is essentially the same as the floating head according to the modification of the fifth embodiment shown in FIG. 27 except that the lower part of the space within the optical path forming aperture 6 in the inner element 4 is filled with a transparent filler 60 that is made of PMMA. Naturally, this floating head retains the advantages described in the discussion of the first embodiment. In addition, the transparent filler 60 with which the optical path forming aperture is closed on side that is closer to the magneto-optical disk 8 is not only effective in stabilizing the floating head 1 as it runs afloat.

Figure 32:
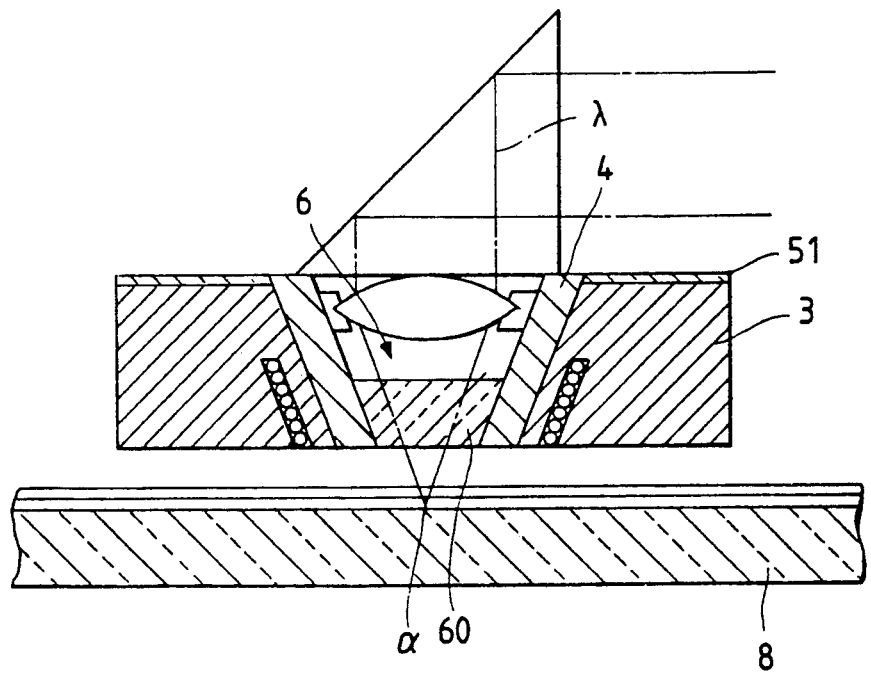
FIG. 32 is a cross section of a floating head according to a modification of the seventh embodiment.

Needless to say, the floating head according to the fifth embodiment in which the optical path forming aperture 6 is provided with a slope that is substantially the same as the angle of convergence of laser light (λ) may be modified as shown in FIG. 32 by filling the lower part of the aperture with the transparent filler 60.

According to the present invention, even in the absence of as great a magnetizing force as has been needed in the prior art, a magnetic field having the intensity necessary for magneto-optical recording or erasure can be formed on the focusing plane of the optical recording medium, whereby not only the number of turns of the coil mounted on the floating head but also the current to be supplied to the coil can be reduced, with the resulting advantage of increased writing or rewriting speed.

What is claimed is:

1. A floating head for use with a recording apparatus of magneto-optical memory type, comprising:
    a floating body made of a soft magnetic material which is provided in the vicinity of a rotating optical recording medium and which is made afloat by an air stream created by the rotation of the optical recording medium, said floating body including an aperture which provides an optical path through said floating body, and a rim portion made of a soft magnetic material which protrudes from a peripheral edge of said aperture towards the optical recording medium;
    an objective lens which is provided in said aperture for focusing light from a light source onto a focal plane of the optical recording medium; and
    magnetic field generating means, formed in the vicinity of the aperture in said floating body, for generating a magnetic field toward the focal plane of the optical recording medium to record or erase information at a location on the optical recording medium where the light focused by said objective lens impinges on the optical recording medium.

2. The floating head according to claim 1, wherein said rim is tapered such that the thickness of said rim portion in a direction parallel to the focal plane of said optical recording medium decreases gradually toward the optical recording medium.

3. A floating head for use with a recording apparatus of magneto-optical memory type, comprising:
    a floating body which is provided in the vicinity of a rotating optical recording medium and which is made afloat by an air stream created by the rotation of the optical recording medium, said floating body including an outer element formed of a non-magnetic material and having an aperture formed therethrough, and an inner element formed of a soft magnetic material and provided within said aperture of said outer element to provide an optical path therethrough, wherein the end of said inner element closest to the optical recording medium is tapered;
    an objective lens which is provided in said aperture for focusing light from a light source onto a focal plane of the optical recording medium; and
    magnetic field generating means, formed in the vicinity of the aperture in said floating body, for generating a magnetic field toward the focal plane of the optical recording medium to record or erase information at a location on the optical recording medium where the light focused by said objective lens impinges on the optical recording medium.

4. The floating head according to claim 3, wherein the inner element is tapered such that the thickness of said inner element portion in a direction parallel to the focal plane of said optical recording medium decreases gradually toward the optical recording medium.

5. The floating head according to claim 3, wherein the inner element is shaped like a truncated hollow cone having inner walls sloped parallel to the light focused onto the optical recording medium.

6. A floating head for use with a recording apparatus of magneto-optical memory type, comprising:
    a floating body which is provided in the vicinity of a rotating optical recording medium and which is made afloat by an air stream created by the rotation of the optical recording medium, said floating body including an outer element which is formed of a non-magnetic material and having an aperture formed therethrough, an inner element formed of a soft magnetic material and provided within said aperture of said outer element to provide an optical path therethrough, and a magnetic path forming portion formed of a soft magnetic material and provided on a least part of the outside surface of said outer element except in a peripheral area of said aperture of said outer element on the side closest to the optical recording medium;
    an objective lens which is provided in said aperture for focusing light from a light source onto a focal plane of the optical recording medium; and
    magnetic field generating means, formed in the vicinity of the aperture in said floating body, for generating a magnetic field toward the focal plane of the optical recording medium to record or erase information at a location on the optical recording medium where the light focused by said objective lens impinges on the optical recording medium.

7. A floating head for use with a recording apparatus of magneto-optical memory type, comprising:
    a floating body made of a soft magnetic material which is provided in the vicinity of a rotating optical recording medium and which is made afloat by an air stream created by the rotation of the optical recording medium, said floating body including an aperture which provides an optical path through said floating body, and a rim portion made of a soft magnetic material which protrudes from a peripheral edge of said aperture towards the optical recording medium;
    an objective lens which is provided in said aperture for focusing light from a light source onto a focal plane of the optical recording medium; and
    magnetic field generating means, formed in the vicinity of the aperture in said floating body, for generating a magnetic field directed toward a focal point where the light focused by said objective lens is focused on the optical recording medium such that information is recorded or erased at said focal point.

* * * * *

UNITED STATES PATENT AND TRADEMARK OFFICE
CERTIFICATE OF CORRECTION

PATENT NO. : 5,124,961
DATED : June 23, 1992
INVENTOR(S) : Shoji Yamaguchi et al.

It is certified that error appears in the above-identified patent and that said Letters Patent is hereby corrected as shown below:

Title page, item (54), change "DEVICE" to --TYPE--.

Claim 6, column 12, line 33, before "least" change "a" to --at--.

Title page, item (30), Foreign Application Priority Data,
change "Japan ....... 1-338600" to
--Japan ....... 2-338600--.

Signed and Sealed this

Twenty-eighth Day of September, 1993

Attest:

BRUCE LEHMAN

Attesting Officer

Commissioner of Patents and Trademarks